US008565134B2

(12) United States Patent
Kong et al.

(10) Patent No.: US 8,565,134 B2
(45) Date of Patent: Oct. 22, 2013

(54) SLEEP MODE SELECTION EMPLOYING A SEMI-MARKOV DECISION PROCESS

(75) Inventors: Lei Kong, Shanghai (CN); Ka Wai Wong, New Territories (HK); Danny Hin Kwok Tsang, New Territories (HK)

(73) Assignee: Dynamic Invention LLC, Victoria, Mahe (SC)

( * ) Notice: Subject to any disclaimer, the term of this patent is extended or adjusted under 35 U.S.C. 154(b) by 367 days.

(21) Appl. No.: 12/958,185

(22) Filed: Dec. 1, 2010

(65) Prior Publication Data
US 2012/0057513 A1 Mar. 8, 2012

Related U.S. Application Data

(60) Provisional application No. 61/380,875, filed on Sep. 8, 2010.

(51) Int. Cl.
*G04C 17/00* (2006.01)
(52) U.S. Cl.
USPC ............................................ 370/311; 370/318
(58) Field of Classification Search
USPC .......................................................... 370/311
See application file for complete search history.

(56) References Cited

U.S. PATENT DOCUMENTS

| 2008/0009328 A1* | 1/2008 | Narasimha ..................... 455/574 |
| 2008/0107056 A1* | 5/2008 | Choi et al. .................... 370/311 |
| 2009/0325533 A1* | 12/2009 | Lele et al. .................. 455/343.1 |
| 2011/0149820 A1* | 6/2011 | Lee et al. ..................... 370/311 |

OTHER PUBLICATIONS

Non patent doucment Modeling study of the sleep mode in the IEEE 802. 16e.*
IEEE. Part 16: Air Interface for Fixed Broadband Wireless Access Systems. Draft IEEE Standard for Local and Metropolitan Area Networks, IEEE P802.16-REVd/D4-2004, dated Mar. 29, 2004. http://hunter.hosted.pl/tts/Strony_www_TTS_2004.2005/ LMDS_Marcin.Gilewski_Lukasz.Waksmanski/airInterface.pdf. Last accessed Mar. 31, 2011, 802 pages.
Chlamtac, et al. Energy-Conserving Access Protocols for Identification Networks. IEEE/ACM Transaction Networking, vol. 7, pp. 51-59, Feb. 1999. http://delivery.acm.org/10.1145/300000/299910/ 00759318.pdf?key1=299910&key2=9702851031&coll=DL& dl=ACM&ip=122.162.49.96&CFID=15943296& CFTOKEN=63393209. Last accessed Mar. 31, 2011, 9 pages.
Chiasserini, et al. Improving Energy Saving in Wireless Systems by Using Dynamic Power Management. IEEE Trans. Wireless Commun., vol. 2, No. 5, pp. 1090-1100, Sep. 2003. http://www. urbanresponse.org/pubs/upload/326_Chiasserini2005.pdf. Last accessed Mar. 31, 2011, 11 pages.
Yang, et al. Modeling UMTS Discontinuous Reception Mechanism, IEEE Trans. Wireless Commun., vol. 4, No. 1, pp. 312-319, Jan. 2005. http://ir.lib.nctu.edu.tw/dspace/bitstream/987654321/1448/1/ 020108015.pdf. Last accessed Mar. 31, 2011, 8 pages.

(Continued)

*Primary Examiner* — Bunjob Jaroenchonwanit
(74) *Attorney, Agent, or Firm* — Turocy & Watson, LLP

(57) ABSTRACT

The disclosed subject matter relates to energy efficiency in mobile devices associated with a wireless communications environment. Power Saving Classes (PSCs) aim to reduce the power consumption of mobile devices based on the different types of traffic. Optimizing sleep mode selection schemes so as to maximize the energy efficiency while providing a QoS guarantee can be accomplished with optimization of a theoretical framework based on the semi-Markov Decision Process along with a performance evaluation on the sleep mode operation. A novel Policy Optimization algorithm is capable of finding optimized policies for a selection of different PSCs.

22 Claims, 16 Drawing Sheets

(56) References Cited

OTHER PUBLICATIONS

IEEE. Part 11: Wireless LAN Medium Access Control (MAC) and Physical Layer (PHY) Specifications. IEEE Computer Society LAN MAN Standards Committee, IEEE Standard for Information Technology http://www.cs.uiuc.edu/homes/haiyun/cs598hl/papers/802.11-1999.pdf. Last accessed Mar. 31, 2011, 528 pages.

Krashinsky, et al. Minimizing Energy for Wireless Web Access with Bounded Slowdown. Proc. ACM MobiCom'02, Atlanta, GA, Sep. 2002, pp. 119-130. http://nms.csail.mit.edu/papers/bsd-mobicom02.pdf. Last accessed Mar. 31, 2011, 12 pages.

Wong, et al. Switching Cost Minimization in the IEEE 802.16e Mobile WiMAX Sleep Mode Operation. Proc. of ACM IWCMC 2009, Leipzig, Germany, Jun. 2009. http://delivery.acm.org/10.1145/1590000/1582503/p567-wong.pdf?key1=1582503&key2=7182951031&coll=DL&dl=ACM&ip=122.162.49.96&CFID=15943296&CFTOKEN=63393209. Last accessed Mar. 31, 2011, 6 pages.

Kong Lei. Performance Analysis and Optimization for MAC-layer IEEE 802.16e Power Saving Mechanism. HKUST MPhil Thesis, Jun. 2007. http://lbxml.ust.hk/th_imgo/b987676.pdf. Last accessed Mar. 31, 2011, 105 pages.

Tijms. A First course in Stochastic Models, John Wiley and Sons, Inc., NY, 2003. http://www.lia.ufc.bri/~carlos/livros/Tijms%20A%20First%20Course%20in%20Stochastic%20Models.pdf. Last accessed Apr. 1, 2011, 482 pages.

Ross. Stochastic Process, Second Edition, John Wiley and Sons, Inc., NY, 1996. http://www.4shared.com/get/knjZrblp/stochastic_Processes_by_sheldo.html. Last accessed Apr. 1, 2011, 265 pages.

Ross. Introduction to Probability Models, Sixth Edition, Academic Press, London, 1997. http://www.4shared.com/get/HxFGN7d3/Optimized_with_bookmark-_Intro.html. Last accessed Apr. 1, 2011, 663 pages.

Seo, et al. Performance Analysis of Sleep Mode Operation in IEEE 802.16e. Proc. IEEE VTC'2004-Fall, pp. 1169-1173, vol. 2, Sep. 2004. http://ieeexplore.ieee.org/articleSale/Sarticle.jsp?arnumber=1400205.

Han, et al. Performance Analysis of Sleep Mode Operation in IEEE 802.16e Mobile Broadband Wireless Access Systems. IEEE 63rd Vehicular Technology Conference, VTC 2006-Spring. http://citeseerx.ist.psu.edu/viewdoc/download?doi=10.1.1.95.4227&rep=rep1&type=pdf. Last accessed Mar. 31, 2011, 5 pages.

Jang, et al. Adaptive Power Saving Strategies for IEEE 802.16e Mobile Broadband Wireless Access. Asia Pacific Conference on Communications, 2006, APCC'06. http://mwnl.snu.ac.kr/-schoi/publication/Conferences/06-APCC-Jang.pdf. Last accessed Apr. 1, 2011, 5 pages.

Benini, et al. Policy Optimization for Dynamic Power Management. IEEE Trans. Computer-Aided Design of Integrated Circuits and Systems, vol. 18, No. 6, Jun. 1999. http://si2.epfl.ch/~demichel/publications/archive/1999/CADICSvol18iss6Jun99pg813.pdf. Last accessed Apr. 1, 2011, 21 pages.

Simunic, et al. Event-driven Power Management. IEEE Trans. Computer-Aided Design Integrated Circuits Systems, vol. 20, No. 7, Jul. 2001. http://seelab.ucsd.edu/papers/trosing_tcad01.pdf. Last accessed Apr. 1, 2011, 18 pages.

"The Java Network Simulator—JNS," [Online]. Available: http://jns.sourceforge.net, 2005. Last accessed Apr. 1, 2011, 1 page.

Agharebparast, et al. A New Traffic Rate Estimation and Monitoring Algorithm for the QoS-Enabled Internet http://www.ece.ubc.ca/~vleung/conference_papers/gc2003_farshid.pdf. Last accessed Apr. 1, 2011, 5 pages.

Wong, et al. Joint Optimization of Power Saving Mechanism in the IEEE 802.16e Mobile WiMAX. To appear in Proc. IEEE Globecom, 2009. http://202.194.20.8/proc/GLOBECOM2009/DATA/PID968585.PDF. Last accessed Apr. 1, 2011, 6 pages.

Wang. Capacity Improvement and Analysis for Voice/Data Traffic over WLAN http://www.ece.ualberta.ca/~hai1/TWireless_2007_04.pdf. Last accessed Apr. 1, 2011, 12 pages.

IEEE. Part 16: Air interface for fixed and mobile broadband wireless access systems—amendment for physical and medium access control layers for combined fixed and mobile operation in licensed bands. IEEE 802.16e-2005, Feb. 2006, 840 pages. http://www.techstreet.com/cgi-bin/detail?doc_no=IEEE|802_16e_2005&product_id=1270606.

Anand, et al. "Self-tuning wireless network power management," MobiCom'03, Sep. 14-19, 2003, San Diego, California, USA. 14 pages.

Krashinsky, R., and Balakrishnan, H. Minimizing energy for wireless web access with bounded slowdown. In Proceedings of the 8th Annual International Conference on Mobile Computing and Networking (MOBICOM '02) (Atlanta, GA, Jul. 2002). 12 pages.

Zhang. Performance Modeling of Energy Management Mechanism in IEEE 802.16e Mobile WiMAX. IEEE Wireless Commun. Networking Conf. (WCNC 2007), Hong Kong, Mar. 2007. http://ieeexplore.ieee.org/articleSale/Sarticle.jsp?arnumber=4224836.

Xiao. Energy saving mechanism in the IEEE 802.16e wireless MAN. IEEE Communications Letters, vol. 9, Issue 7, Jul. 2005. http://ieeexplore.ieee.org/articleSale/Sarticle.jsp?arnumber=1461675.

\* cited by examiner

Algorithm 1 Policy Optimization Solving Algorithm

Require: Traffic rate $\lambda$ and delay boundary $\delta$; Compute $D(a)$ and $C(a)$.

1: if $\delta < \min D(a)$ then
2:    for $k = 1$ to $3$ do
3:       $x(a_k) = \begin{cases} 1 & \text{if } k = \arg\min_{l=\{1,2,3\}} \bar{d}(a_l) \\ 0 & \text{otherwise} \end{cases}$
4:    end for
5: else if $\delta > \max D(a)$ then
6:    for $k = 1$ to $3$ do
7:       $x(a_k) = \begin{cases} 1 & \text{if } k = \arg\min_{l=\{1,2,3\}} \bar{c}(a_l) \\ 0 & \text{otherwise} \end{cases}$
8:    end for
9: else
10:    $\bar{c}^* = \infty$
11:    for $i = 1$ to $3$ do
12:       for $j = i + 1$ to $3$ do
13:          if $[\delta - \bar{d}(a_i)][\delta - \bar{d}(a_j)] \leq 0$ then
14:             if $[\bar{c}(a_i) - \bar{c}(a_j)][\bar{d}(a_i) - \bar{d}(a_j)] < 0$ then
15:                for $k = 1$ to $3$ do
16:                    $x(a_k) = \begin{cases} [\delta - \bar{d}(a_j)] / [\bar{d}(a_i) - \bar{d}(a_j)] & \text{if } k = i \\ [\delta - \bar{d}(a_i)] / [\bar{d}(a_j) - \bar{d}(a_i)] & \text{if } k = j \\ 0 & \text{if } k \neq i,j \end{cases}$
17:                end for
18:             else
19:                for $k = 1$ to $3$ do
20:                   $x(a_k) = \begin{cases} 1 & \text{if } k = \arg\min_{l=\{i,j\}} \bar{c}(a_l) \\ 0 & \text{otherwise} \end{cases}$
21:                end for
22:             end if
23:          else if $(\delta > \bar{d}(a_i) \text{ and } \delta > \bar{d}(a_j))$ then
24:             for $k = 1$ to $3$ do
25:                $x(a_k) = \begin{cases} 1 & \text{if } k = \arg\min_{l=\{i,j\}} \bar{c}(a_l) \\ 0 & \text{otherwise} \end{cases}$
26:             end for
27:          else
28:             for $k = 1$ to $3$ do
29:                $x(a_k) = 1$
30:             end for
31:          end if
32:          if $C^T(a)x(a) < \bar{c}^*$ then
33:             $\bar{c}^* = C^T(a)x(a)$
34:             $x(a)^* = x(a)$
35:          end if
36:       end for
37:    end for
38: end if

FIG. 8

SLEEP MODE SELECTION EMPLOYING A SEMI-MARKOV DECISION PROCESS

RELATED APPLICATIONS

This application claims the benefit of U.S. Provisional Application No. 61/380,875, filed 8 Sep. 2010, which is hereby incorporated by reference in its entirety.

TECHNICAL FIELD

The various embodiments of the subject disclosure relate generally to wireless communications, and more particularly to sleep mode selection for components associated with wireless communications.

BACKGROUND

Growing numbers of users are wirelessly accessing systems such as the internet and cellular telephone systems. Energy efficiency in mobile devices designed to operate with these wireless access systems remains a critical issue in the design of wireless communication systems. Energy efficiency can be improved by employing lower power schemes, e.g., sleep modes or variations thereof. These lower power schemes can reduce energy consumption by cycling between a higher power consumption mode (e.g., an active state) and a lower power consumption mode (e.g., a reduced activity or inactive state) as will be appreciated by those of skill in the art.

A drawback to lower power schemes is that they can be associated with degraded communications performance. As an example, spending time in an inactive state can decrease signal reception periods and thus decrease communication performance (e.g., when a device is asleep it generally does not receive or transmit data, etc.) In order to provide a high Quality of Service (QoS), wireless standards can support various power saving schema. Each of these power saving schema can include different sleep times or sleep patterns that can have different balances between energy consumption and device performance. For example, the IEEE 802.16e standard provides at least three unique Power Saving Classes (PSCs) which aim to reduce the power consumption of mobile devices based on different types of anticipated wireless traffic. Conventional selection of the various PSCs in wireless systems can improve energy efficiency but much room remains in optimizing the selection of these PSCs for improved energy efficient sleep mode selection schemes.

SUMMARY

The following presents a simplified summary of the various embodiments of the subject disclosure in order to provide a basic understanding of some aspects described herein. This summary is not an extensive overview of the disclosed subject matter. It is intended to neither identify key or critical elements of the disclosed subject matter nor delineate the scope of the subject various embodiments of the subject disclosure. Its sole purpose is to present some concepts of the disclosed subject matter in a simplified form as a prelude to the more detailed description that is presented later.

An embodiment of the presently disclosed subject matter, can include a system that facilitates access to one or more sleep mode selection policies, comprising a semi-Markov decision process (MDP) component, wherein the MDP component accesses at least one wireless system parameter and employs a semi-Markov decision process model in determining the one or more sleep mode selection policies.

In another embodiment, the disclosed subject matter can be in the form of a method, accessing at least one wireless system parameter, determining at least one optimized sleep mode selection policy, and facilitating access to the at least one determined sleep mode selection policy.

A further embodiment of the disclosed subject matter includes modeling sleep mode operation of a mobile subscriber station (MSS) as a MDP to facilitate computing performance evaluations of wireless power saving classes associated with the MSS and the wireless communications system, modeling a cost function for a sleep mode behavior of the MSS, and selecting an optimized sleep mode selection policy from a set of sleep mode selection policies for the MSS based in part on minimizing the power consumption of the MSS.

The following description and the annexed drawings set forth in detail certain illustrative aspects of the disclosed subject matter. These aspects are indicative, however, of but a few of the various ways in which the principles of the various embodiments of the subject disclosure can be employed and the disclosed subject matter is intended to include all such aspects and their equivalents. Other advantages and distinctive features of the disclosed subject matter will become apparent from the following detailed description of the various embodiments of the subject disclosure when considered in conjunction with the drawings.

BRIEF DESCRIPTION OF THE DRAWINGS

FIG. 8 illustrates exemplary pseudo-code for sleep mode policy selection optimization in accordance with an aspect of the disclosed subject matter.

DETAILED DESCRIPTION

Figure 1:
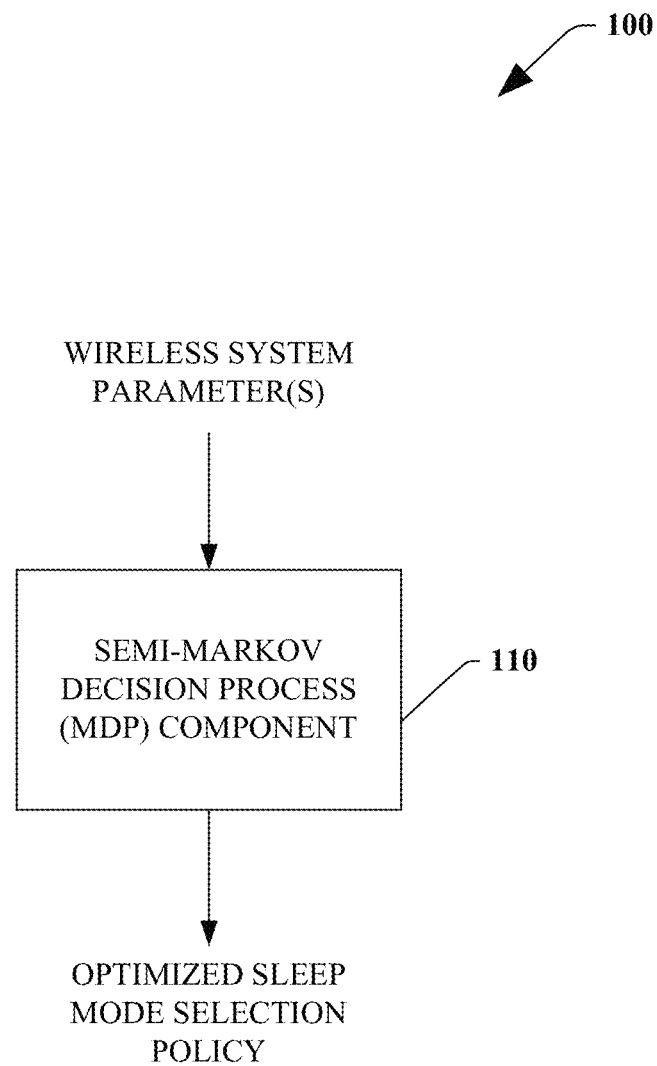
FIG. 1 is a diagram of a system that can facilitate access to one or more optimized sleep mode selection policies in accordance with an aspect of the subject matter disclosed herein.

Energy efficiency in mobile devices remains a critical issue in the design of wireless communication systems. Generally a balance must be achieved between Quality of Service (QoS) in wireless communications and power consumption in wireless devices (e.g., mobile subscriber stations (MSS), user equipments (UEs), etc.) For example, the IEEE 802.16e-2005 standard supports three unique Power Saving Classes (PSCs) which aim to reduce the power consumption of mobile devices based on different types of anticipated traffic. An optimizing sleep mode selection scheme to maximize the energy efficiency of wireless devices while providing a certain QoS guarantee is highly desirable. A theoretical framework based on the semi-Markov Decision Process (MDP) along with a performance evaluation on the sleep mode operation can be employed to generate optimized results. As used herein, the term "optimized' is used inclusively to indicate some level of optimization up to and including, but not limited to, an ideal optimization (e.g., an optimized result can be less optimal than an ideally optimized result). A stochastic optimization problem can be solves by way of a novel Policy Optimization (PO) algorithm, based at least in part on the MDP model, which can determine an optimized sleep mode selection policy. Exemplary numerical and simulation results demonstrate the validity of the disclosed subject matter under different QoS requirements such as the packet delay and energy consumption level. Thus, optimized sleep mode selection can provide improved energy consumption while maintaining desired QoS levels. For simplicity, the presently disclosed subject matter will generally be illustrated within the realm of the IEEE 802.16e mobile system, though it can be applied in a nearly limitless number of wireless systems and schemes as will be readily appreciated by one of skill in the relevant arts, and all such permutations are expressly within the scope of the subject disclosure.

In the IEEE 802.16e-2005 standard (hereinafter IEEE 802.16e), three types of Power Saving Classes (PSCs) are designed for different types of traffic. The main difference between three PSCs is the way that a sleep window is determined. In short, the sleep windows for type I is incrementally doubled if no traffic is sensed. In contrast, for type II, the sleep windows reminds constant. Moreover, for type III, only one sleep window is applied. According to the IEEE 802.16e standard, PSCs of type I are recommended for Best Effort (BE) and non-realtime (NRT) service, while type II is recommended for the unsolicited granted service (UGS) and real-time variable rate (RT-VR) service connection. Further, PSCs of type III is recommended only for use with multicast or management traffic. Sleep mode in the 802.16e standard has been well recognized as an effective way for discontinuous reception, whereby idle devices power down and turn on their receivers at some future time instant based on traffic arrival to prevent unnecessary power usage.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter can be practiced without these specific details. In other instances, well-known structures and devices are illustrated in block diagram form in order to facilitate describing the various embodiments of the subject disclosure.

Turning to the figures, FIG. 1 illustrates a system 100 that can facilitate access to one or more optimized sleep mode selection policies in accordance with an aspect of the subject matter disclosed herein. System 100 can include semi-Markov decision process (MDP) component 110. MDP component 110 can access one or more wireless communications systems parameters. For example, a wireless communications systems parameters can indicate UE loading on base station (BS) resources such as how many carrier channels are free, how many UEs are registers to a BS, percentage of active registered UEs on a BS, etc.

MDP component 110 can facilitate access to one or more optimized sleep model selection policies. In an aspect, MDP component 110 can similarly facilitate access to derivatives of optimized sleep model selection policies, for example timeout interval values, decision values, etc. In accordance with the disclosed subject matter, MDP component 110 can, in an aspect, determine the one or more optimized sleep mode selection policies. These determinations can be based, at least in part, on the wireless system parameters. Further, these determinations can employ cost metric determinations, policy optimization computations, etc.

Optimized sleep model selection policies can be employed in selecting or switching among a plurality of sleep schema or PSCs. As a non-limiting example, where a UE is regularly receiving packet data, the UE can employ a first sleep mode, however, when a base station indicates that it is heavily loaded, the UE can select a second sleep mode in anticipation of decreased data throughput. One of skill in the art will appreciate that numerous other examples are readily grasped and that all are within the scope of the present disclosure.

Figure 2:
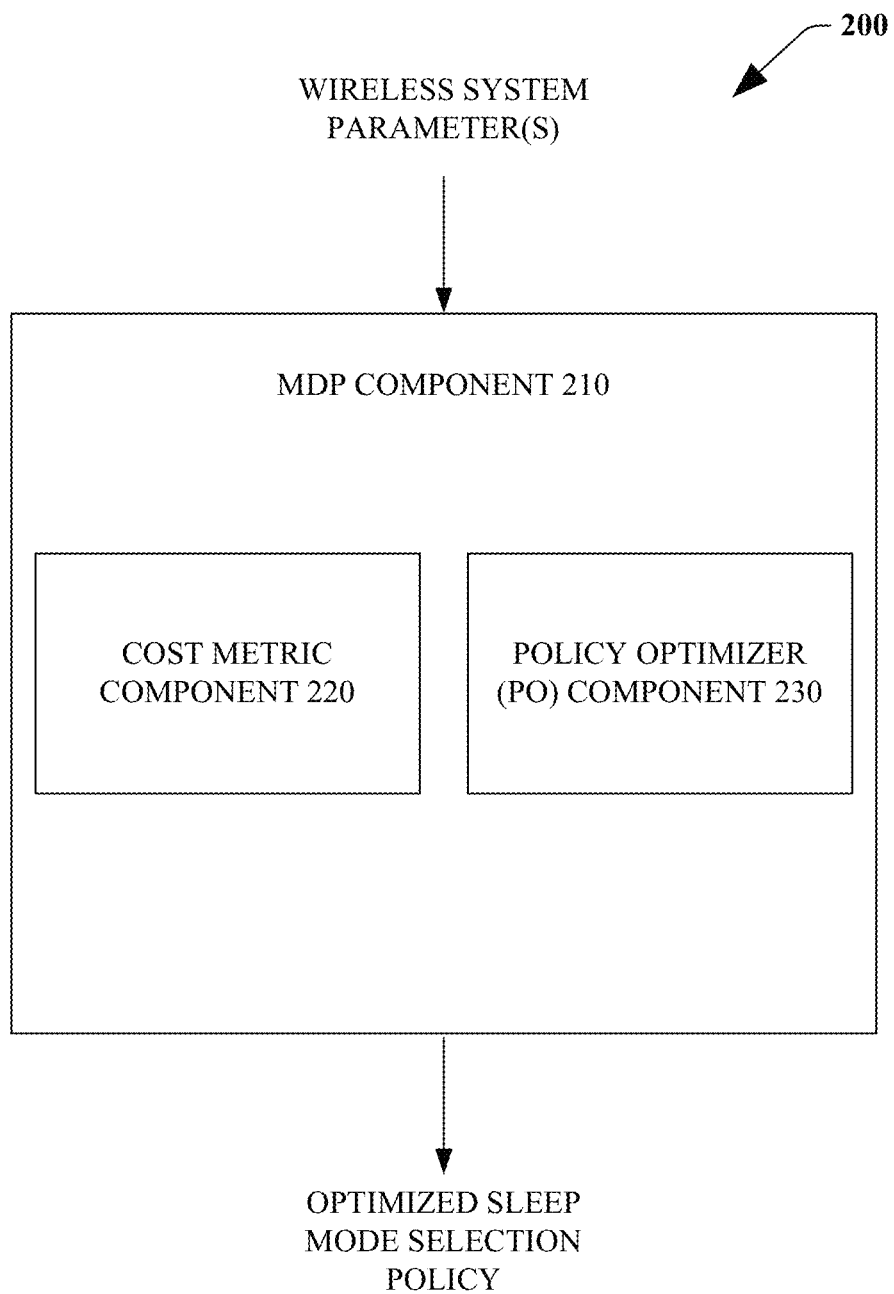
FIG. 2 is a diagram of a system that can facilitate access to one or more optimized sleep mode selection policies in accordance with an aspect of the subject matter disclosed herein.

FIG. 2 is a diagram of a system 200 that can facilitate access to one or more optimized sleep mode selection policies in accordance with an aspect of the subject matter disclosed herein. System 200 can be the same as, or similar to, system 100. System 200 can include MDP component 210. MD)P component 210 can include cost metric component 220. Cost metric component 220 can, in an aspect, facilitate cost determinations. For example, cost determinations can relate to packet delay, energy consumption, sleep ratio, sleep mode switching costs, etc.

In an aspect, system 200 can include policy optimized (PO) component 230. PO component 230 can facilitate optimization of a policy. PO component 230 can, in an aspect, consider one or more of cost metrics (e.g., those facilitated by cost metric component 220, etc.), QoS requirements, traffic conditions, etc., to optimize one or more sleep mode selection policies. These sleep mode selection policies can be accessed to facilitate reduced energy consumption for a MSS.

For optimizing sleep mode selection policies, it can be assumed that packet arrival to the system follows the Poisson distribution with average rate $\lambda$ packets per frame. Without loss of generality, a fixed frame length can be used (for simplicity, the present disclosure uses 1 ms herein throughout unless otherwise expressly or inherently stated). Further, let $\mu$ denote the mean packet service rate between a BS and a MSS. For clarity, the discussion herein focuses on a point-to-point downlink communication from a BS associated with one MSS although, as will be appreciated by one of skill in the art, this is not meant to be a limitation of the presently disclosed subject matter.

Figure 3:
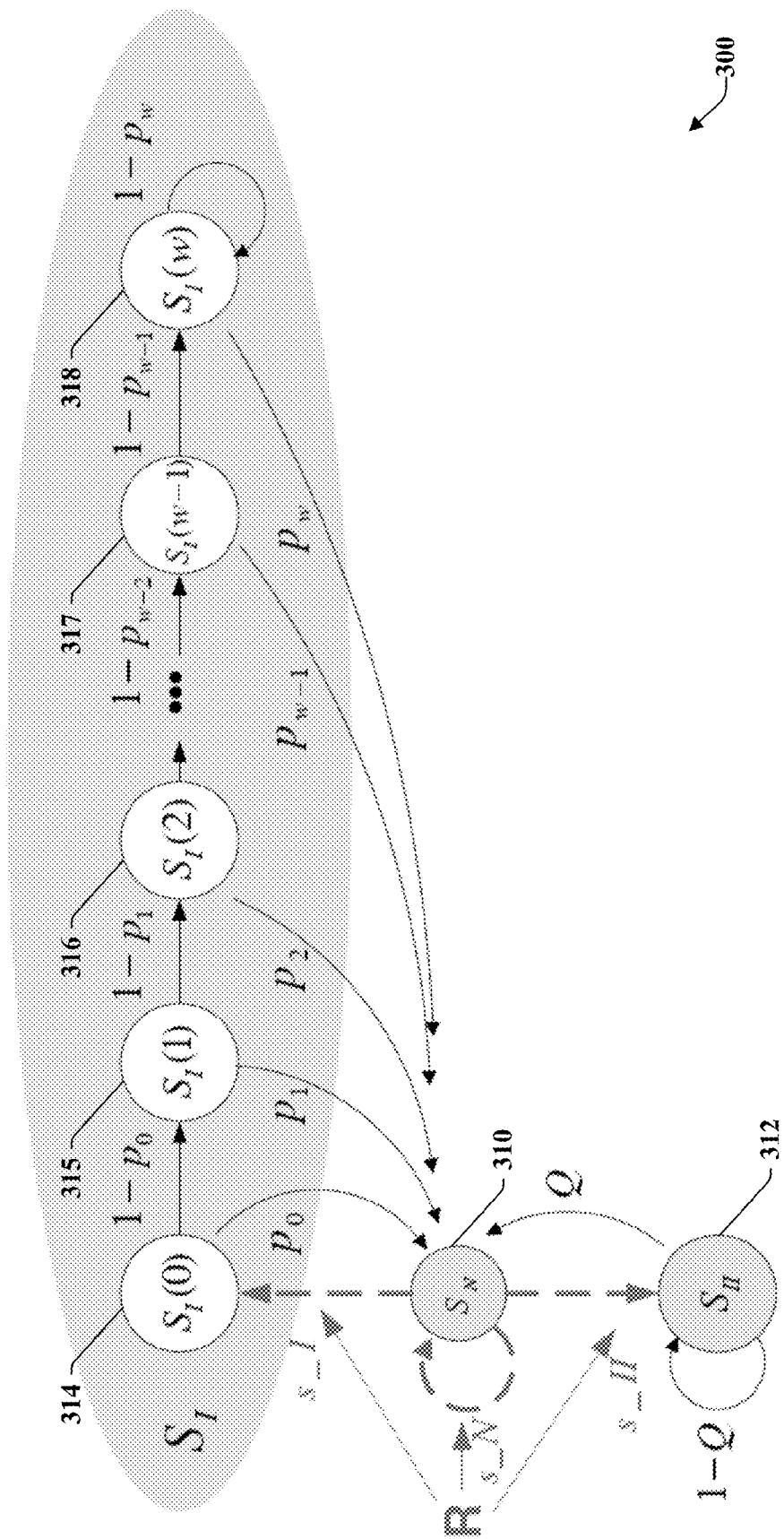
FIG. 3 is a schematic diagram of a stochastic controllable Markov model for three power saving classes in accordance with an aspect of the subject matter disclosed herein.

Turning now to FIG. 3, presented is a schematic diagram 300 of a stochastic controllable Markov model for three power saving classes in accordance with an aspect of the subject matter disclosed herein. The MDP model employed is illustrated as a transitional diagram, where each state represents one unique sleep stage. According to the MDP definition, the model can be abstracted as a three-state set $I=\{S_N, S_I, S_{II}\}$, representing normal sleep mode, sleep mode of type I and sleep mode of type II. FIG. 3 illustrates each of these states respectively joining with some policy (denoted as R) for controlling operation mode. R is defined as a prescription for taking actions at each decision epoch, whether a deterministic policy or a randomized policy. It is assumed that each decision epoch only occurs once a MSS becomes idle (termination of busy period) in the normal mode. The action variable a is chosen from a three-command set $A=\{s\_N, s\_I, s\_II\}$, with the intuitive meaning of "switching to normal sleep mode", "switching to sleep mode type I", and "switching to sleep mode type II", respectively. To simplify notation herein, we symbolize the three distinctive actions as $a_i$ where $I=1, 2,$ or $3$. For illustration, when an action is taken, MSS will move to a new state in the next frame with a probability depending on the action. The model assumes the subsequently chosen action a is independent of past history. Wherein the operational mode switching is not a random behavior, the illustrated transitions (dashed lines in FIG. 3) are responsive to specific actions and are thus deterministic. For example, $P[s'|s, a]$ is 1, meaning the current state s transfers to the next state s' with probability 1 when a given action is taken.

Initially, a MSS stays in normal sleep mode if action s_N occurs, transmitting and receiving packets. Otherwise, the MSS goes to PSC of type I immediately if action s_I occurs or the MSS immediately goes to type II if action s_II occurs. To illustrate the type I, let $S_1(k)$ ($0 \leq k \leq w$) be the multiple sleep stages and w be the final sleep stage indicator. For example, according to the IEEE 802.16e standard, each $S_1(k)$ has a binary-increasing sleep window size $2^k T_0$ and a constant listen interval $T_L$. The MSS receives the traffic indication message from the BS in $T_L$ to decide whether to wake up or remain asleep. When packets arrive at the BS, the BS transmits a positive traffic indication message to the MSS in $T_L$ to notify the arrival (shown in FIG. 4 at 410). As such, $p_k$ is the probability of packet arrival at BS in $S_I(k)$ equal to the transition probability from $S_I(k)$ to $S_N$. If the MSS gets a negative traffic indication, then it transitions to the next sleep stage $S_I(k+1)$ with probability $(1-p_k)$ until it reaches the final sleep stage $S_I(w)$. Under the Poisson arrival assumption, we have $$p_k = 1 - e^{-\lambda V_k}, \quad (1)$$

where $V_k$ is denoted as vacation time at stage k, which is $$V_k = 2^k T_0 + T_L, \quad 0 \leq k \leq w. \quad (2)$$

If action s_II is taken, the MSS switches to sleep mode type II that consists of one single sleep state $S_{II}$ with constant sleep window size $T_S$. The MSS can remain in sleep mode if the accumulative arriving packets during the previous vacation time $V_{II}$ ($V_{II} = T_S + T_L$) is less than or equal to the maximum packet number d. As such, the MSS can be allowed to transmit packets during the period of $T_L$. $d = \lfloor \mu \cdot T_L \rfloor$, depending on the length of $T_L$ and transmission rate. Otherwise, MSS can return to the normal sleep mode if the total incoming packets exceed d. Let Q be the transition probability from $S_{II}$ to $S_N$ such that $$Q \triangleq Pr\{J > d\} = 1 - \sum_{j=0}^{d} \frac{(\lambda V_{II})^j e^{-\lambda V_{II}}}{j!} \quad (3)$$

It is possible to find an optimized sleep mode selection policy R* through assigning optimal values among these controllable transitions. A sleep mode selection policy R can be written as the solution set of all controllable probabilities, namely, $\{x_i(a), \forall i \in I, \forall a \in A\}$, where $x_i(a)$ ($0 \leq x_i(a) \leq 1$) is known as the state-action frequencies. It will be appreciated by one of skill in the art that given the total number of decisions issued in state i, $x_i(a)$ is the expected proportion of times that command a is selected. Thus, $x_i(a)$ satisfies $\Sigma_{a \in A} x_i(a) = 1$ for any given $i \in I$. In the model illustrated at 300, decisions do not occur in sleep mode, which means $\forall i \in \{S_I, S_{II}\}$, $x_i(a) = 0$, $\forall a \in A$. R becomes a 3-tuple $\{x_{S_N(s_N)}, x_{S_N(s_I)}, x_{S_N(s_{II})}\}$. For a given policy R such that all the $x_i(a)$ are given, there must be a unique equilibrium distribution $\pi_j^R$, $j \in I$ that can be obtained from the following equations $$\begin{cases} \pi_{S_I}^{(R)}(k) = \pi_{S_I}^{(R)}(0) \prod_{i=0}^{k-1} (1 - p_i), 1 \leq k \leq w - 1 \\ \pi_{S_I}^{(R)}(w) = \pi_{S_I}^{(R)}(0) \prod_{i=0}^{w-1} (1 - p_i) + \pi_{S_I}^{(R)}(w)(1 - p_w) \\ \pi_{S_N}^{(R)} = \pi_{S_N}^{(R)} x_{S_N}(s\_N) + \sum_{k=0}^{w} \pi_{S_I}^{(R)}(k) p_k + \pi_{S_{II}}^{(R)} Q \\ \pi_{S_{II}} = \pi_{S_N}^{(R)} x_{S_N}(s\_II) + (1 - Q)\pi_{S_{II}}^{(R)} \\ 1 = \sum_{k=0}^{w} \pi_{S_I}^{(R)}(k) + \pi_{S_N}^{(R)} + \pi_{S_{II}}^{(R)} \\ 1 = \sum_{a \in A} x_{S_N}(a) \end{cases} \quad (4)$$

where $\pi_{S_I}^{(R)}(k), k = 0, 1, 2, \ldots, w$, is the steady state probability for the sleep mode at stage k under policy R, while $\pi_{S_{II}}^{(R)}$ and $\pi_{S_N}^{(R)}$ are the steady state probabilities of type II and normal mode, respectively. Since w, $T_0$, $T_S$ and $T_L$ are with sleep mode configurations and $\lambda$, $\mu$ are known by given system environment, if R is known, all the steady state probabilities can be obtained.

Figure 4:
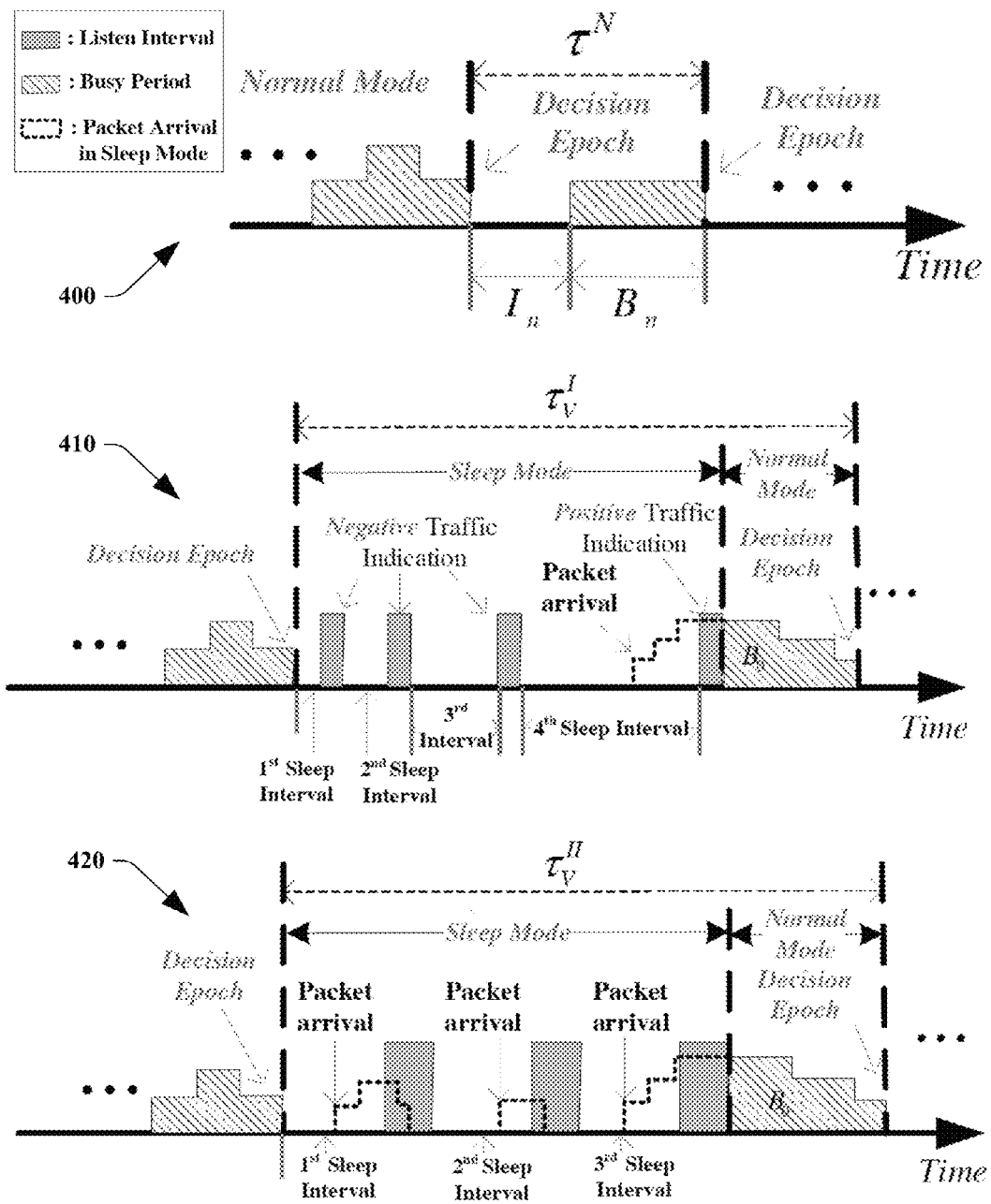
FIG. 4 is a schematic diagram of operational cycles for three power saving classes in accordance with an aspect of the subject matter disclosed herein.

Another basic element of the MDP framework includes cost metrics (or cost functions). These cost metrics are relevant to the optimization. As non-liminitng examples, sleep ratio, energy cost, and packet delay can be used to illustrate cost metrics. Let i be the present state associated with each action a taken. For better illustration, let $\bar{\gamma}_i(a)$, $\bar{c}_i(a)$, and $\bar{d}_i(a)$ be the expected sleep ratio, the expected power consumption level, and the expected packet delay respectively. Whereas decisions only occur in state $S_N$ (as stated previously), we will omit the subscript $S_N$ for notational succinctness. Furhter, let $\Gamma(a)$, $C(a)$, $D(a)$ be the vector form of each cost metric, respectively:

$$\Gamma(a) := \begin{bmatrix} \bar{\gamma}(s\_N) \\ \bar{\gamma}(s\_I) \\ \bar{\gamma}(s\_II) \end{bmatrix} \quad (5)$$

$$C(a) := \begin{bmatrix} \bar{c}(s\_N) \\ \bar{c}(s\_I) \\ \bar{c}(s\_II) \end{bmatrix}$$

$$D(a) := \begin{bmatrix} \bar{d}(s\_N) \\ \bar{d}(s\_I) \\ \bar{d}(s\_II) \end{bmatrix}$$

in which each row represents a corresponding action taken from A. The cost metrics can thus be derived from the sleep behavior decribed in FIG. 4. With regard to FIG. 4, illustrated is a set of exemplary, non-limiting, schematic diagrams, 400, 410 and 420, illustrating operational cycles for three PSCs in accordance with an aspect of the subject matter disclosed herein. The three scenarios in FIG. 4 satisfy the following Markovian properties: if an action a is taken at the decision epoch in state i, then the time between now and the next decision epoch depends only on the present state i. Also, the cost functions depend only on the present state and chosen action. Additionally, for any chosen decision, $S_N$ is strictly recurrent [3] since MSS will eventually return to $S_N$ with probability 1. Such property introduces the application of renewal-reward [3] theory, which leads to the following important conclusion: the average cost equals to the long-run average actual cost per time unit when policy R is used independent of the initial state.

Let N, I and II be the superscripts for the normal sleep mode, type I and type II PSCs, respectively. To measure the usage of serving BS's air interface resource (AIR), the sleep ratio $\bar{\gamma}$ can be defined as the time that MSS can power down its transceiver (release its uplink and downlink connections with BS) compared with the total operation time. Thus $\bar{\gamma}$ is a system-level performance metric that reflects a BS's connection capacity in its service area. It is evident that $\bar{\gamma}(s\_N)=0$, whereas $\bar{\gamma}(s\_I)$ and $\bar{\gamma}(s\_II)$ are written as $$\bar{\gamma}(s\_I) = \frac{\bar{\tau}_S^I}{\bar{\tau}_V^I}, \bar{\gamma}(s\_II) = \frac{\bar{\tau}_S^{II}}{\bar{\tau}_V^{II}}, \quad (6)$$

which is the expected sleep time $\bar{\tau}_S$ (excluding $T_L$, because MSS needs to wake up during the $T_L$ to receive at least one traffic indication message, the same way as in normal mode) divided by the total expected operation cycle time $\bar{\tau}_V$.

For the duration of $\bar{\tau}_V^I$ (see FIG. 4 at 410), MSS transfers to PSC of type I, traverses some sleep stages, and wakes up upon traffic arrival to transmit data until it is idle. Therefore, the $\bar{\tau}_V^I$ consists of one duration of sleep mode, followed by a busy period $B^I$ to transmit the accumulated data arriving during the prior vacation period. For notational convenience, denote $\tilde{p}_k$ as the probability that MSS sleeps for k vacation cycles before switching. Further, k can exceed the value of final sleep stage w, after which MSS remains in $S_I(w)$ for (k−w+1) cycles until it wakes up. Let $\bar{\tau}_V^I(k)$ be the expected duration after sleeping for k vacations until the next decision epoch. Thus, $\bar{\tau}_V^I$ can be written as $$\bar{\tau}_V^I = \sum_{k=0}^{\infty} \tilde{p}_k \bar{\tau}_V^I(k), \quad (7)$$

where $\tilde{p}_k$ and $\bar{\tau}_V^I(k)$ are $$\tilde{p}_k = \begin{cases} p_0, k = 0 \\ p_k \prod_{i=0}^{k-1}(1-p), 1 \le k \le w-1 \\ p_w(1-p_w)^{k-w} \prod_{i=0}^{w-1}(1-p), k \ge w \end{cases} \quad (8)$$

$$\bar{\tau}_V^I(k) = \begin{cases} \sum_{i=0}^{k} V_i + E[B^I(k)], 0 \le k \le w-1_k \\ \sum_{i=0}^{w} V_i + (k-w)V_w + E[B^I(w)], k \ge w \end{cases} \quad (9)$$

$E[B^I(k)]$ is the mean time of exceptional busy period to transmit previously buffered traffic accumulated in sleep stage k. To derive $E[B^I(k)]$, take into account the scenario of new arrival packets during $B^I(k)$. Thus the expected value becomes $$E[B^I(k)] = (E[M_{buf}(k)] + E[M_{new}(k)])E[S], \quad (10)$$

where $E[M_{buf}(k)] = \lambda V_k$ (Little's Law) is the mean number of packet accumulated during prior vacation period and $E\lfloor M_{new}(k)\rfloor = \lambda E\lfloor B^I(k)\rfloor$ is the mean number of new arriving packet during the $B^I(k)$. S is the random variable of service time for each packet and $E[S]=1/\mu$. Thus, we can obtain $$E[B^I(k)] = \frac{\lambda V_k}{\mu - \lambda}, \quad (11)$$

Since sleep time only includes binary-increased sleep window, $\bar{\tau}_S^I$ can be derived using above equations except $T_L$ and busy period. In other words, the pure sleep time for type I is $$\bar{\tau}_S^I = \Sigma_{k=0}^{\infty} \tilde{p}_k \bar{\tau}_S^I(k), \quad (12)$$

where $\bar{\tau}_S^I(k)$ is the expected sleep time for stage k and $$\bar{\tau}_S^I(k) = \begin{cases} \sum_{i=0}^{k} 2^i T_0, 0 \le k \le w-1 \\ \sum_{i=0}^{w} 2^i T_0 + (k-w)2^w T_0, k \ge w, \end{cases} \quad (13)$$

which is equivalent to the vacation time $\bar{\tau}_V^I$ excluding the listen interval and busy period.

For type II (see FIG. 4 at 420) with single constant vacation cycle, the duration of one operational cycle can be obtained according to the geometric distribution:

$$\bar{\tau}_V^{II} = \sum_{k=1}^{\infty} \{kV_{II} + E[B^{II}]\}(1-Q)^{k-1}Q = \frac{1}{Q}V_{II} + E[B^{II}] \quad (14)$$

where $E[B^{II}] = \lambda V_{II}/(\mu-\lambda)$ and $(1-Q)^{k-1}Q$ indicates the probability of k successful consecutive sleep periods before waking up. The corresponding sleep time is $\bar{\tau}_S^{II} = T_S/Q$.

To evaluate the power usage of MSSs the energy cost $\bar{c}$ can be derived wherein it is intuitively interpreted as the mean power consumption level of the system. Denote $P_B$, $P_I$, $P_S$, $P_L$ as the given power consumption level in busy period, idle period, sleep time, and listen interval, respectively. Whereas the normal mode time alternates between idle periods I (no arrival of packets) and busy period B (at least one packet arrival in transmission). Energy cost $\bar{c}(s\_N)$ is then expressed as $$\bar{c}(s\_N) = \frac{P_I E[I] + P_B E[B]}{E[I] + E[B]}, \qquad (15)$$

and the average idle time and the average busy period can be expressed as $$E[I] = \frac{1}{\lambda}, E[B] = \frac{E[S]}{1 - \lambda E[S]}, \qquad (16)$$

For type I, the mean power consumption level is written as $$\bar{c}(s\_I) = \frac{E_{SW} = \sum_{k=0}^{\infty} \tilde{p}_k \bar{\varepsilon}^I(k)}{\tau_V^I}, \qquad (17)$$

which is the total expected energy consumption of one regenerative cycle, divided by the operation cycle time. $E_{sw}$ denotes the energy consumption switching between normal mode and sleep mode (activation and deactivation). $\bar{\varepsilon}^I(k)$ is the total expected energy consumption when system wakes up after k vacation cycles. It is given by $$\bar{\varepsilon}^I(k) = \begin{cases} \sum_{i=0}^{k} \varepsilon_V^I(i) + P_B E[B^I(k)], 0 \le k \le w - 1 \\ \sum_{i=0}^{w} \varepsilon_V^I(i) + (k-w)\varepsilon_V^I(w) + P_B E[B^I(w)], k \ge w \end{cases} \qquad (18)$$

in which $\varepsilon_V^I(i) = P_S 2^i T_0 + P_L T_L$ ($0 \le i \le w$) is the energy consumption at sleep stage i.

Whereas type II can take advantage of listen interval to transmit limited arriving packets, a random busy period $B_L$ during $T_L$ is more likely to exist. By applying Little's Law, the mean value of such busy time is $E[B_L] = \lambda V_{II}/\mu$. Let $\varepsilon_V^{II}$ be the whole energy consumption during the vacation period of type II:

$$\varepsilon_V^{II} = \left(\frac{1}{Q} - 1\right)\{P_S T_s + P_L(T_L - E[B_L]) + P_B E[B_L]\} + (P_S T_s + P_L T_L), \qquad (19)$$

which consists of (1/Q−1) replicated vacation cycles (scenario illustrated in FIG. 2(c) the 1$^{st}$ and 2$^{nd}$ vacation cycles) and one last cycle before waking up (the 3$^{rd}$ vacation cycle). In Eq.(19), we assume the power level of busy period in $T_L$ is same as $P_B$. $\bar{c}(s\_II)$ can be written as $$\bar{c}(s\_II) = \frac{E_{SW} + \varepsilon_V^{II} + P_B E[B^{II}]}{\tau_V^{II}}. \qquad (20)$$

As shown in FIG. 4. (at 410 and 420), incoming traffic can experience a delay when the MSS is still asleep. The illustrated MDP model, it is given that the packet arrival follows the Poisson distribution. However, the service rate can fall into the general distribution mainly due to the irregularity of sleeping periods, which depends on the types of sleep mode. Thus, M/G/1 queue is the best option to describe the packets arrival and departure. Therefore, $\bar{d}(s\_N)$ is the direct result from M/G/1 model, $$\bar{d}(s_N) = E[W] + E[S], \qquad (21)$$

where E[W] is the expected waiting time of the packet. Based on Pollaczek-Khintchine (P-K) mean value formula [5], E[W] is defined as $$E[W] = \frac{\rho E[R]}{1 - \rho}, \qquad (22)$$

where $\rho @ \lambda/\mu$ is traffic intensity and $E[R] = E[S^2]/(2E[S])$ is the residual processing time.

To derive packet delay under sleep mode, the expected packet delay $\bar{d}_S$ when the server is on vacation can be calculated as $$\bar{d}_S = \bar{d}_V + \bar{d}_Q + \bar{d}(s_N), \qquad (23)$$

in which the first term is the average remaining vacation time for the packet. $\bar{d}_Q$ is the expected queuing delay after MSS wakes up and transmits the accumulative packet arrived during vacation, followed by the mean packet delay in normal mode.

According to M/G/1 with server vacation, $\bar{d}_V$ is $$\bar{d}_V = \frac{E[V^2]}{2E[V]}, \qquad (24)$$

where the random variable V is the duration of vacation time. For types I and II, vacation time is a fixed value depending on the PSC type and the sleep stage, and $E[V] = V$, $E[V^2] = V^2$.

After waking up, the system performs data transmission and empties the buffer, where each packet endures a queuing delay since the possibility of more than one packet arriving during the same V is high. Therefore, $\bar{d}_Q$ indicates the delay of transmitting preceding packets (relative to a given packet) in the buffer and can be calculated as $$\bar{d}_Q = \frac{V}{2}\rho, \qquad (25)$$

Eq.(25) can be derived by using batch-arrival and server-vacation queuing model. Due to the space limit, the derivation has been omitted. Putting Eqs.(24), (25) and (21) into (23), we obtain the exact expression of $\bar{d}_S$.

For type I, let $d_S^I(k)$ be the mean sleep delay for sleep stage k. Rewrite the expression of $\bar{d}_S$:

$$\bar{d}_S^1(k) = \frac{V_k}{2}(1+\rho) + \bar{d}(s_N), \ 0 \le k \le w. \qquad (26)$$

For packet-level delay, the process that packet arrival can be in any one of the sleep stage is well recognized as semi-Markov processes. Thus, define $P^I(k)$ as the proportion of time the packet is in sleep stage k. It is given by $$P^I(k) = \frac{\pi_{S_I}^{(s\_I)}(k)V_k}{\sum_{j=0}^{w}\pi_{S_I}^{(s\_I)}(j)V_j}, \ 0 \le k \le w, \qquad (27)$$

which should be a weighted average of the $\pi_{S_I}^{(s\_I)}(k)$ multiplied by the mean sojourn time spent on sleep stage k, divided by the whole process time. $\pi_{S_I}^{(s\_I)}(k)$, k=0, 1, 2, ..., w, is the steady state probability for the sleep mode at stage k when deterministic command s_I is taken. Thus, $\bar{d}(s\_I)$ is $$\bar{d}(s\_I) = \Sigma_{k=0}^{w} \bar{d}_S^{(I)}(k) P^I(k). \qquad (28)$$

Similarly, the packet delay of type II is $$\bar{d}(s\_II) = \frac{v_{II}(1+\rho)}{2} + \bar{d}(s\_N). \qquad (29)$$

Figure 5:
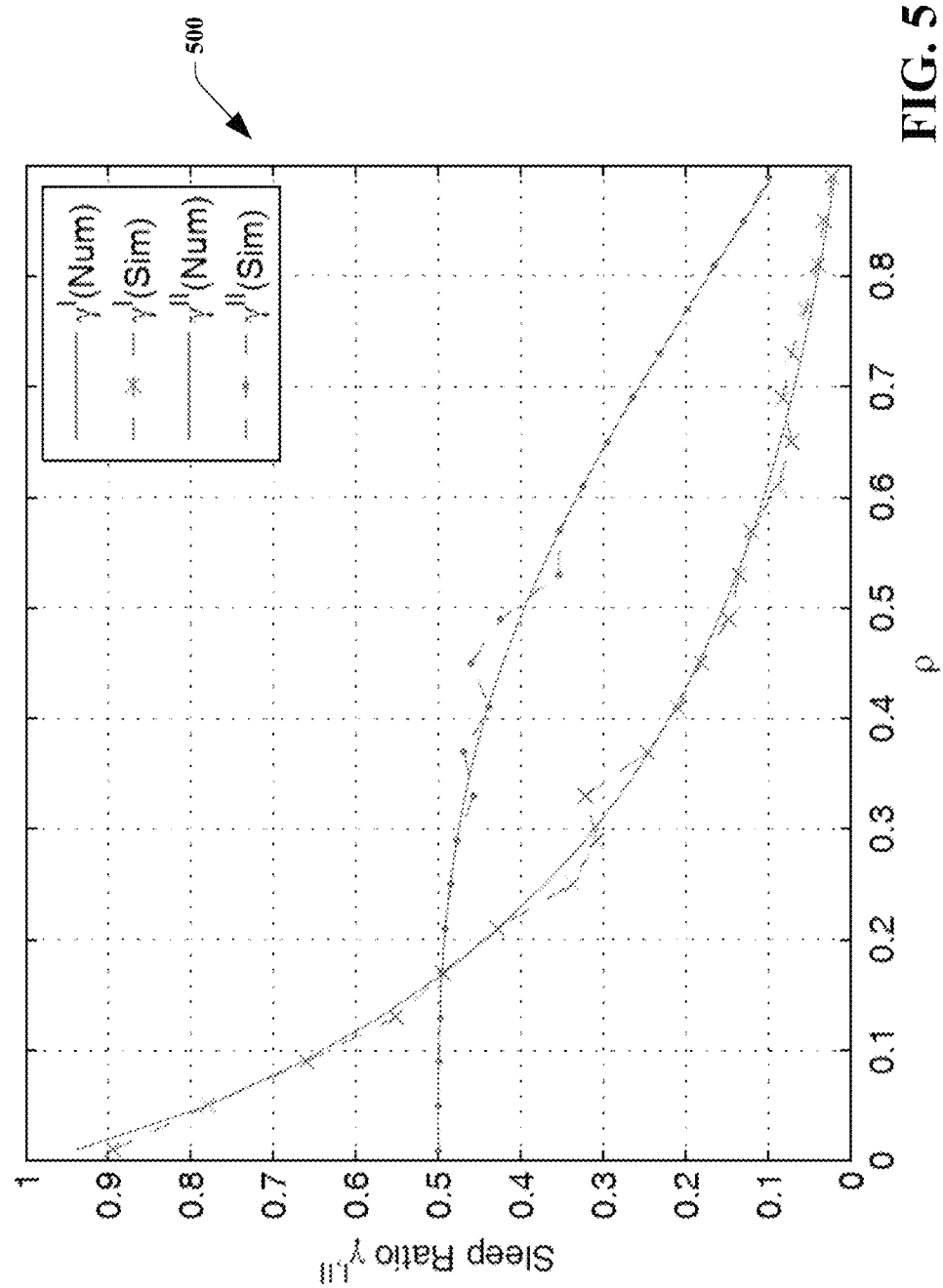
FIG. 5 illustrates exemplary simulation results and exemplary numerical results for sleep ratio of a plurality of power saving classes in accordance with an aspect of the disclosed subject matter.

FIG. 5 illustrates exemplary simulation results and exemplary numerical results 500 for sleep ratio of a plurality of power saving classes in accordance with an aspect of the disclosed subject matter. the results of our evaluation based on the proposed cost metrics. Simulation and numerical results 500 are derived from validating the analytical MDP model bee against a discrete event simulation model built upon a Java Network Simulator (JNS), which is an implementation of the ns-2 simulator with trace files production (same format as NAM trace files). The exemplary simulator parameter settings are set in according with the IEEE 802.16e standard configurations (see sections 6.3.2.3.44 and 10.1 of the IEEE 802.16e-2005 standard). The generated traffic in the exemplary simulation follows a Poisson distribution. The parameters in our numerical calculations and simulations are listed in Table I. Further, whereas the power consumption information of the IEEE 802.16e standard is not currently specified, assume that the power consumption values are in each state as follows: $P_B$=750 mW, $P_I$=$P_L$=170 mW and $P_s$=50 mW, and for switching cost $E_{sw}$=1×10$^{-3}$ J per switch behavior.

More specifically, FIG. 5 illustrates exemplary simulation results and exemplary numerical calculations on sleep ratio against the traffic load for PSCs of type I and type II. These two curves reveal the key features of different sleep patterns between two PSCs: For type I, MSS inclines to enter deep sleep under light traffic, while for type II it has to wake up periodically to receive indication message so as to maintain responsive even when Σ=0.

TABLE 1

Figure 6:
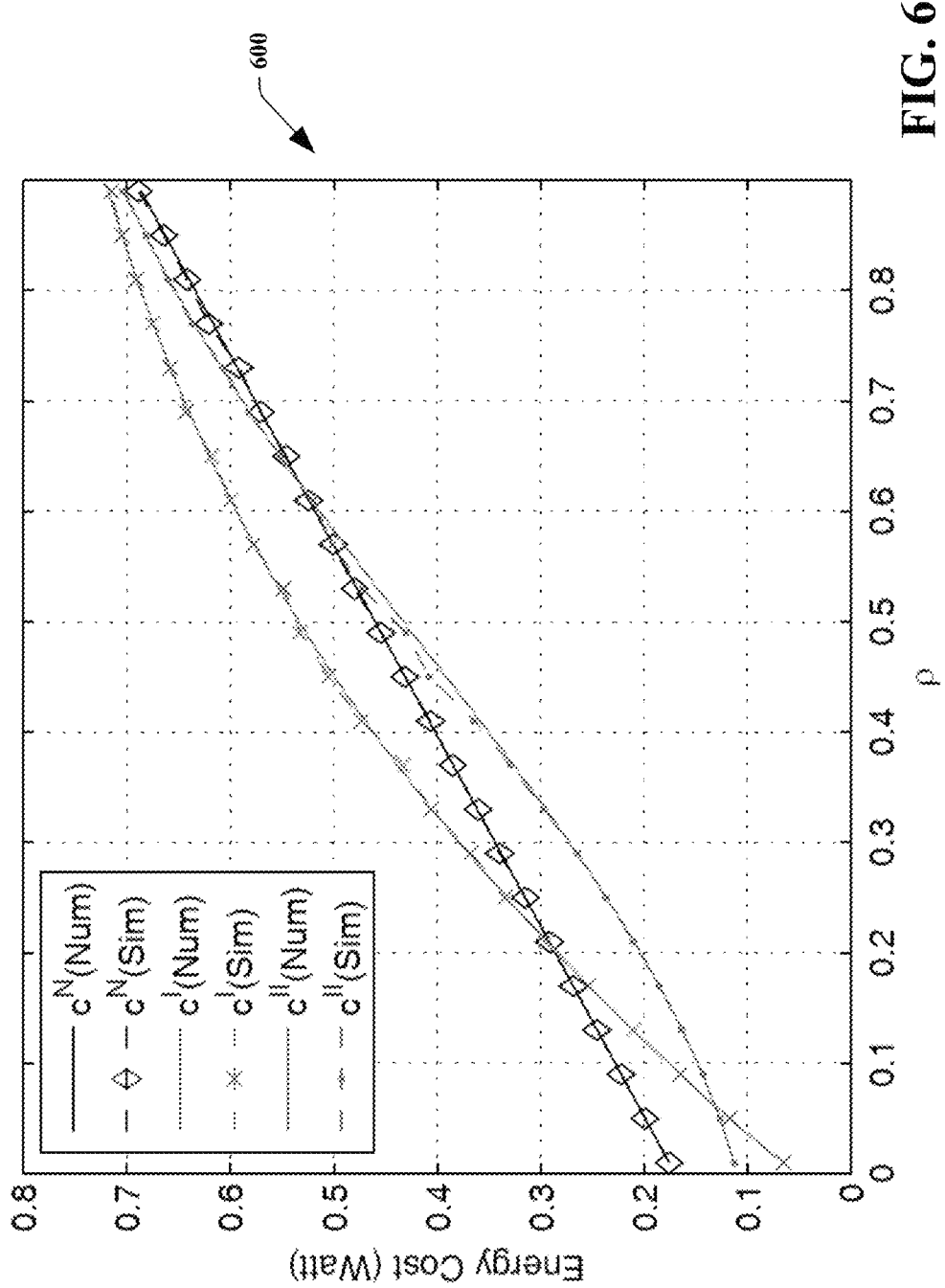
FIG. 6 illustrates exemplary simulation results and exemplary numerical results for energy cost of a plurality of power saving classes in accordance with an aspect of the disclosed subject matter.

Exemplary Numerical and Simulation Parameter Settings (see FIGS. 5 and 6).

| Parameters | Settings |
| --- | --- |
| Payload Size | 500 bytes |
| MAC Frame Duration | 1 ms |
| Propagation Delay | 1 ms |
| Sleep Stage w (Type I) | 9 |
| Listening Interval Size | 1 Frame |
| Initial Sleep Window Size (Type I) | 1 Frame |
| Final Sleep Window Size (Type I) | 512 Frames |
| Sleep Window Size (Type II) | 1 Frame |

FIG. 6 illustrates exemplary simulation results and exemplary numerical results 600 for energy cost of a plurality of power saving classes in accordance with an aspect of the disclosed subject matter. FIG. 6 is obtained under the same parameters as those given for FIG. 5. Looking more closely at, FIG. 6, the exemplary energy cost on mean power consumption in full normal mode, for PSCs of types I and II is illustrated. The exemplary energy cost grows linearly with traffic load without sleep mode operation (simulation plot is dashed line with diamonds). It can furhter be observed that for types I and II some benefits on energy saving can be achieved. Type I (simulation plot is dashed line with "x") achieves better energy performance under light traffic mainly due to its deep sleep characteristics. For type II (simulation plot is dashed line with ".") performes best in the range of medium traffic situation, partly because of its capability of transmitting data during listen interval. However, when traffic grows more intensive, types I and II suffer frequent sleeping and waking up so that switching cost becomes an enormous overhead. Thus, pure normal mode will be the best policy for power saving in this situation.

It is evident from that there is a tradeoff between energy consumption and packet delay among operational modes of wireless communications systems, as illustrated with regard to the IEEE 802.16e standard. Therefore, it is clearly desireable to optimize a sleep mode selection policy such that the subsequent transitions between operational modes helps to minimize overall energy consumption while still providing a sufficient level of QoS. Policy optimization (PO) can be based on the above discussed MDP model framework. For clarity and brevity, only two typical energy-efficient design scenarios for a practical IEEE 802.16e system are disclosed though one of skill in the art will appreciate that many other scenarios exist and are within the scope of the present disclosure.

As already disclosed above, systems can be described by a controlled semi-Markov chain with undetermined policy R. By searching the space of R an optimal R* can be found (e.g., an optimal policy that can approach and/or meet a minimum/maximum cost under a specified level of QoS). Many algorithms are available to solve policy optimization problems efficiently. Some well-known techniques include policy improvement, successive approximations, and linear programming (LP). For ease of illustration LP is selected as an appropriate example technique because it offers a convenient way to handle Markovian decision problems with probabilistic constraints. The reason for using probabilistic constraints is that constraints are normally difficult to estimate or be imposed on certain state frequencies in real-life telecommunication environments. These constraints often involve many random parameters such as traffic demand, MSS demographic data, and transmission rate in wireless channel.

Further, wherein IEEE 802.16e supports two different services, delay-sensitive and delay-tolerant, two probabilistic constrained PO problems can be formulated for each group separately. In an effort to be concise, only the delay-sensitive problem is examined although one of skill in the art will readily appreciate that the subject disclosure is just as readily applicable to delay-tolerant schemes. For delay-sensitive service, optimization can be viewed as a power consumption minimization issue subject to the delay constraint, i.e., $$\min C^T(a)x(a), \quad (30)$$

such that $\Sigma_{a \in A} x_{S_N}(a)=1$, $D^T(a)x(a) \leq \delta$, $x_{S_N}(a) \geq 0$, $\forall a \in A$, where $x(a)=[x_{S_N}(s\_N) \ x_{S_N}(s\_I) \ x_{S_N}(s\_II)]^T$ is the vector form of state action frequencies. Eq. 30 can be solved to minimize the long-run average energy cost per time unit and also require the maximal expected delay to be bounded by a probabilistic constraint $\delta$. The rationale behind Eq.30 is that every given action must associate with certain rewards or penalties (e.g., $\{\bar{\gamma}, \bar{c}, \bar{d}\}$). The allocating fraction in $x(a)$ will thereby weight these cost metrics so as to meet specified parameters, resulting in the long-term behavior of the system, For delay-insensitive services, minimizing MSS's energy consumption and simultaneously reduce the AIR occupancy to the benefit of the whole system is desireable. For example, if BS has N available subcarriers (or subchannels) allocated to M MSSs in the IEEE 802.16e Point-to-Multipoint (PMP) system, then based on the current call admission and cell loading status, BS should centrally regulate cell loading and provide the call admission control (CAC) efficiently. If $N \geq M$, BS is capable of allocating at least one dedicated subcarrier to each MSS. However, where the saturation occurs (e.g., N<M), some MSSs might be denied service due to the AIR constraint. Through sleep mode support, portions of AIR can be resued (called virtual AIR) when MSS is on vacation and some saturation can be tolerated. For example, where $\bar{M}$ is the expected number of active MSSs (i.e., not in sleep mode).a saturated scenario can be represented as $$\min C^T(a)x(a), \quad (31)$$

such that $\Sigma_{a \in A} x_{S_N}(a)=1$, $1-\Gamma^T(a)x(a) \leq N/\bar{M}$, $x_{S_N}(a) \geq 0$, $\forall a \in A$.

Solving Eqs.30 and 31 can be accomplished by employing the simplex method, though this can be computationally intensive and may be burdensome for a resource-constrained MSS in a runtime environment. However, where the action states are reasonably small (e.g., small enough to search through all of them and find the optimal set of policy) the computation can be more easily achieved. Therefore, a lightweight algorithm can be emplyoed, where derived from the presently disclosed our PO structure.

Figure 7:
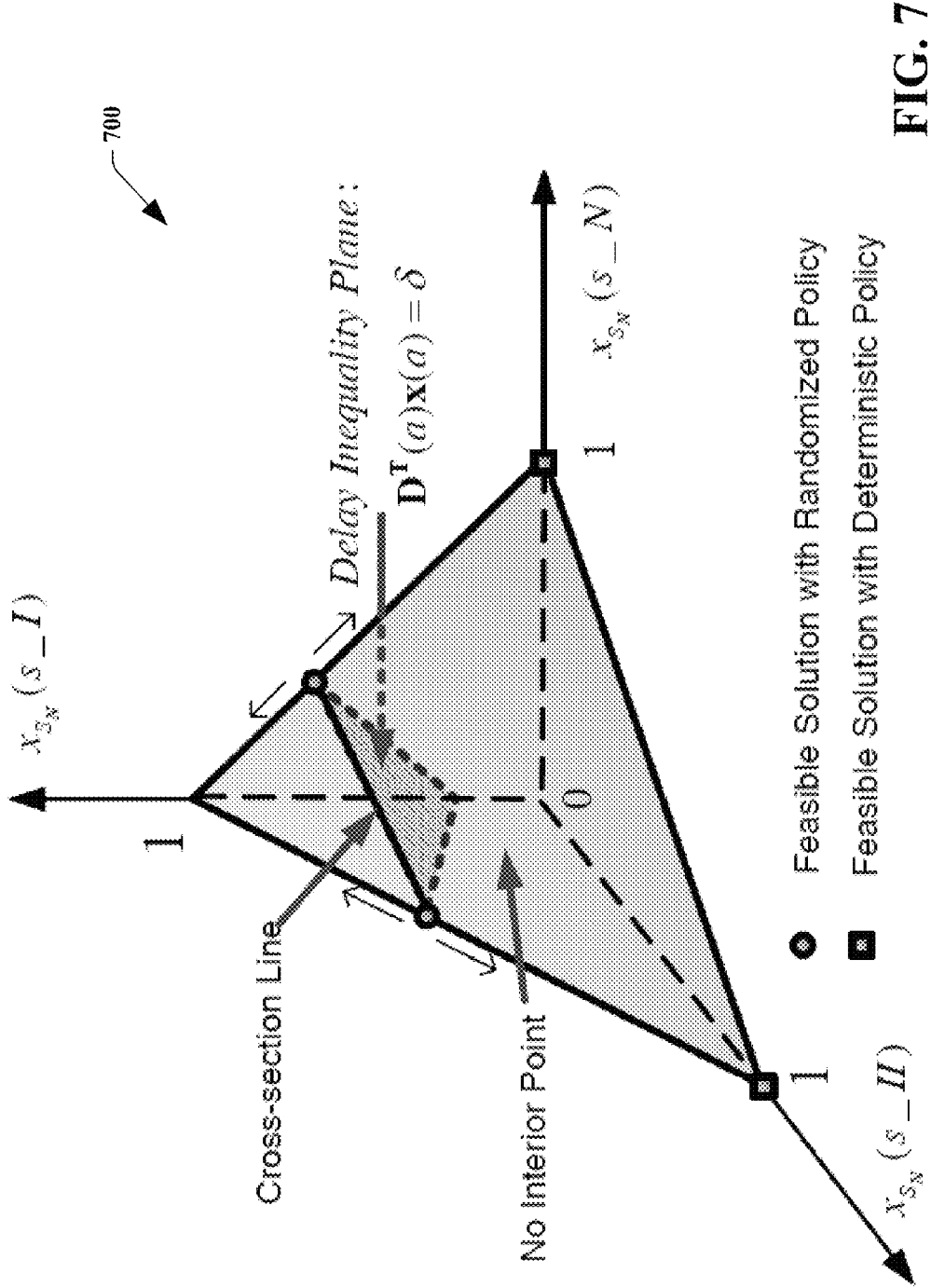
FIG. 7 illustrates a graphic representation of a geometric interpretation of policy optimization for a plurality of power saving classes in accordance with an aspect of the disclosed subject matter.

FIG. 7 illustrates a graphic representation 700 of a geometric interpretation of policy optimization for a plurality of power saving classes in accordance with an aspect of the disclosed subject matter. From Eq.30, the equation and constraints can be represented geometrically as illustrated in FIG. 7. From this figure, each exterior point represents the action frequency ratio between 0 and 1. Due to its sparse constraints, no interior-point solutions can possibly exist in the problem. Instead, all feasible solutions are located on the vertexes of the quadrangular plane.

FIG. 8 illustrates exemplary pseudo-code 800 for sleep mode policy selection optimization in accordance with an aspect of the disclosed subject matter. Where there are sparse constraints (e.g., where no interior-point solutions can possibly exist in the problem and all feasible solutions are thus located on the vertexes of the quadrangular plane as in FIG. 7), an efficient solving algorithm for our PO problems can readily be formed, e.g., the pseudo-code 800 illustrated in FIG. 8. Solutions can thus be classifyed into three categories according to the geometric interpretation (see FIG. 7). For notational convenience, subscripts $S_N$ are omitted in the elements of $x(a)$, the state action frequencies. Further, $a_i$ denotes the $i^{th}$ ($i$=1,2,3) action variable in A and executing a maximization function (or minimization function) on a vector to find the maximal (minimal) element in that vector can be conducted.

By way of further explaining exemplary pseudo-code 800, lines 1-4 of code 800, indicate the infeasible solution (no intersection between the equality plane and the halfspace of delay inequality plane). Thus, even if MSS is never put to sleep, it is impossible to achieve a delay below $\delta$ (under these conditions simply find a policy that gives a minimal delay in order to meet the requirement as much as possible). Lines 5-8 of code 800, denote a deterministic policy schema (rectangular points), where $\delta$ becomes the slack constraint. The required delay can be presummed regardless of the choice of action. Therefore, a system should pick the minimal cost to optimize the energy performance.

Continuing, lines 9-38 of code 800, correspond to randomized policies (e.g., circle points located at the edge of the cross-section lines). Based on the three different cases of delay bounds, it is desireable to search for the action frequency combination which gives the minimum energy cost. As such, lines 13-17 of code 800, search for a randomized policy when $\delta$ lies in between any two delay bounds and the delay is inversely proportional to the energy cost; lines 19-21 are to consider the case of choosing the action that gives the minimal cost when the delay is proportional to the energy cost. Lines 23-26 are similar to lines 5-8 when the delay constraint can be met by any of two selected actions. Lines 28-30 arbitrarily generate a temporary solution if the delay constraint cannot be satisfied by either of the two actions. At the end of each inner for-loop, the exemplary algorithm updates the current combination with the lowest cost combination. Interestingly, most of the processing in Algorithm 1 concentrates on the code between lines 9-38, wherein the searching complexity is $O(|A|^2-|A|)$, which is quadratically proportional to $|A|$, the size of A.

Figure 9:
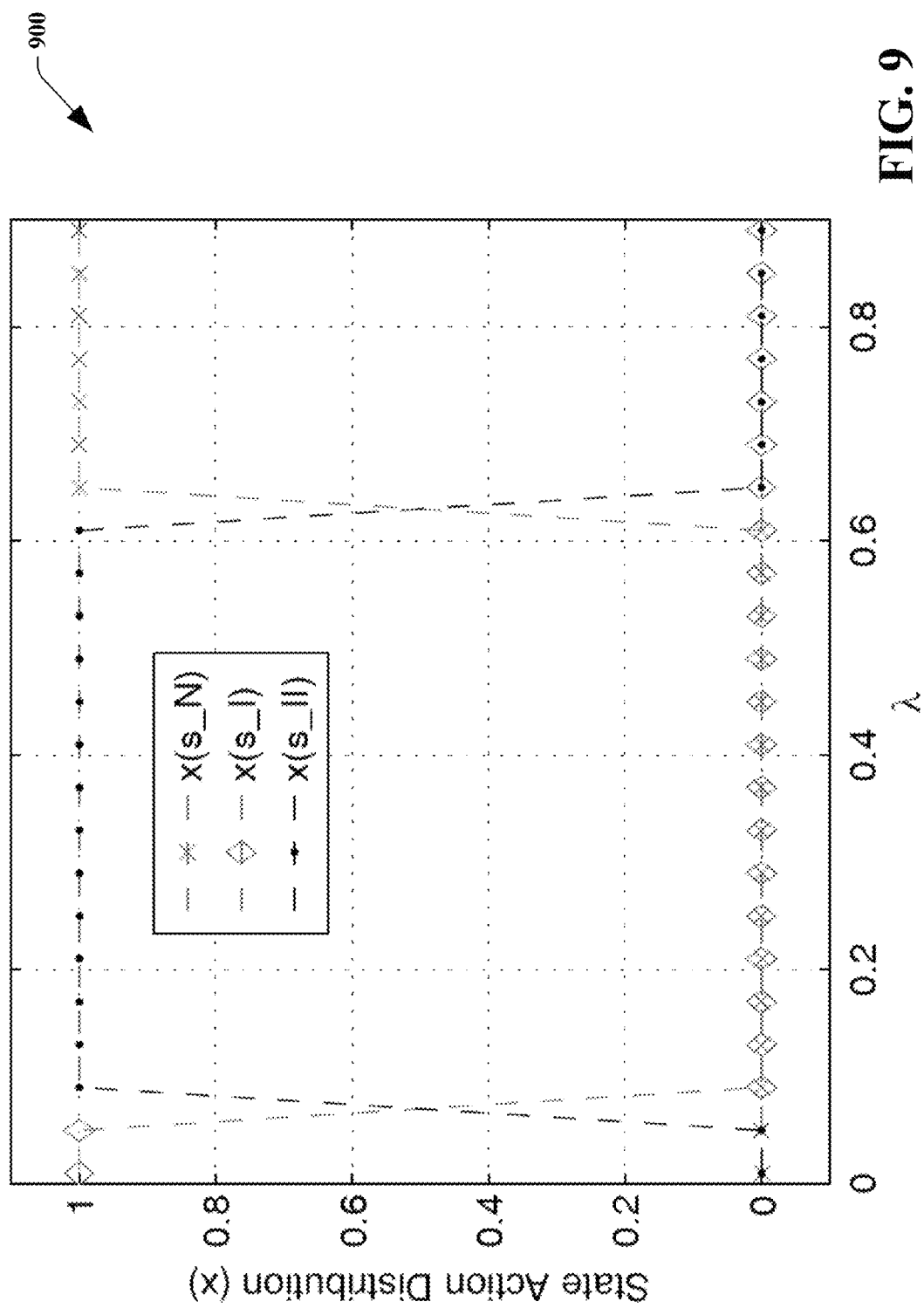
FIG. 9 illustrates exemplary sleep mode policy distributions for delay-insensitive wireless traffic in accordance with an aspect of the disclosed subject matter.

Traffic load, QoS requirements and distinct targets impact optimal policy distribution. FIG. 9 illustrates exemplary sleep mode policy distributions 900 for delay-insensitive wireless traffic in accordance with an aspect of the disclosed subject matter. In an aspect, where no delay constraint is presented (e.g., a delay-insensitive condition) the deterministic policies can be employed to minimize energy cost under various traffic load wherein it can be expected that the energy cost will follow the lower bound of the three curves in FIG. 6 at 600

Figure 10:
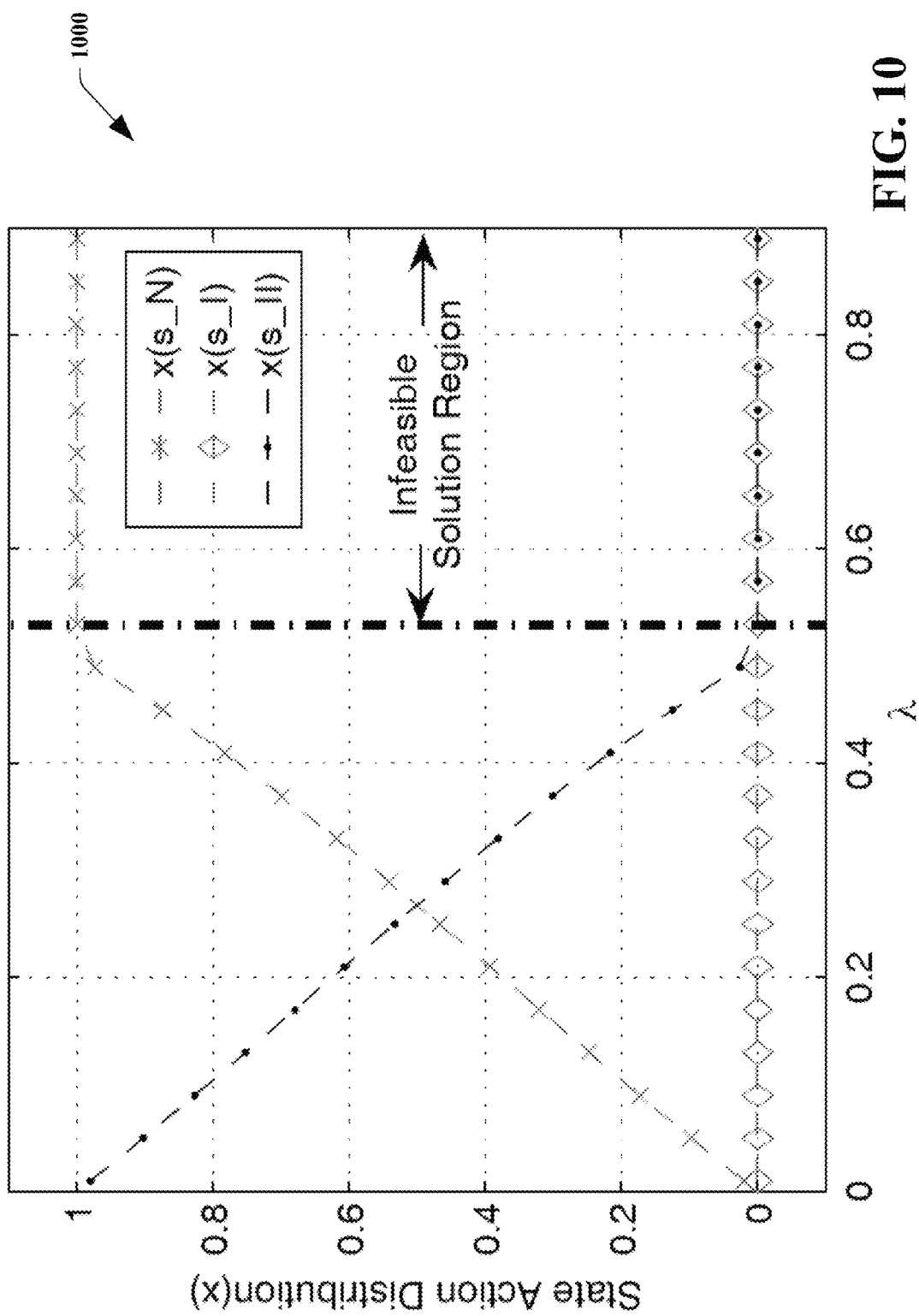
FIG. 10 illustrates exemplary sleep mode policy distributions for delay-stringent wireless traffic in accordance with an aspect of the disclosed subject matter.

In contrast, FIG. 10 presents exemplary sleep mode policy distribution plot 1000 for delay-stringent wireless traffic in accordance with an aspect of the disclosed subject matter. Where a delay-stringent service is presented, randomized policies between s_II and s_N are observed to the left of infeasible solution region in plot 1000. Choosing the decision in a random way rather than in a deterministic fashion can be the best strategy in terms of resource allocation as well as optimality as disclosed hereinabove. For example, a solution to Eq.30, which provides the relation between a low attainable expected energy consumption $\bar{c}^*$ and fulfillment of a specified packet delay $\delta$ can be expressed in a functional form as $\delta \geq g(\bar{c}^*)$, wherein $\{(\bar{c}^*\delta)$ s.t. $\delta \geq g(\bar{c}^*)\}$ is the set of feasible allocations. For example, a deterministic policy scenario, constraints must satisfy $\delta > g(\bar{c}^*)$ strictly, meaning the resource has not yet been fully utilized and optimality has not been reached. However, where the system yields a randomized policy (e.g., when δ=g(c̄*)) then {(c̄*,δ) s.t. δ=g(c̄*)} can be called the set of efficient allocations. Pairs (c̄*,δ) correspond to Pareto points of the power-performance tradeoff curve, namely, they represent solutions of PO that cannot be improved upon in both directions (energy and delay performance), producing Pareto optimality of the system. Thus, randomized policies are appropriate for delay-stringent schema.

The state-action frequency distribution thus provides information that can be employed in determining when a MSS should choose each of the available different sleep modes. Employing Network Simulator 2 (ns-2) the energy efficiency can be illustrated (e.g., ns-2 simulation of MDP demonstrates the performance of the state-action frequency distribution scheme disclosed hereinabove in selecting directed or randomized sleep mode selection policies.

Figure 11:
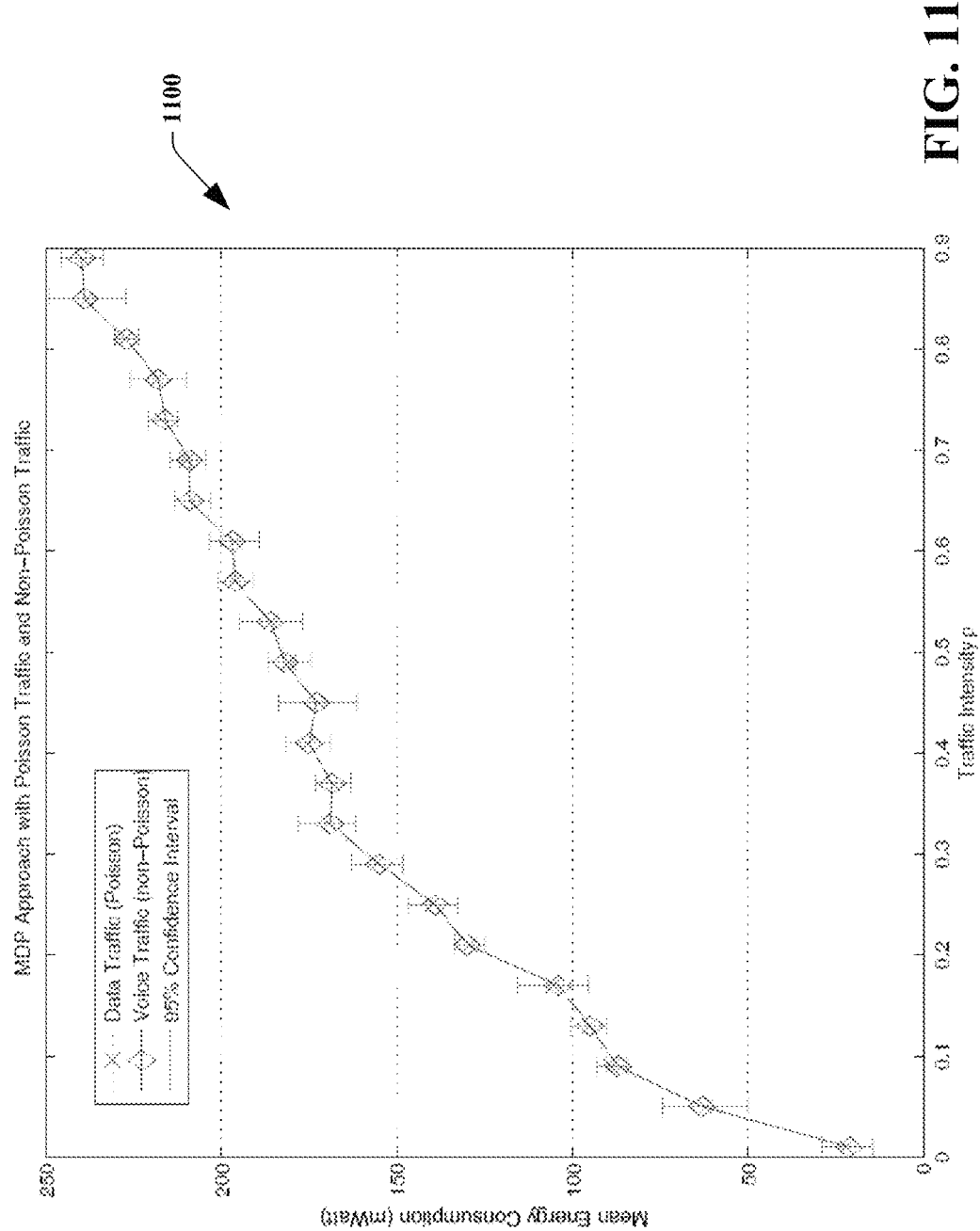
FIG. 11 illustrates exemplary energy consumption for Poisson distributed wireless traffic and non-Poisson distributed wireless traffic in accordance with an aspect of the disclosed subject matter.

FIG. 11 illustrates exemplary energy consumption 1100 for Poisson distributed wireless traffic and non-Poisson distributed wireless traffic in accordance with an aspect of the disclosed subject matter. The simulation can be conducted using ns-2 (e.g., with a conventional trafffic estimator determining λ first) following the settings previously disclosed for the previous models to preserve the consistency. Given a simulation time of 400 seconds and a total numbers of run of 1000, the energy consumption can be averaged over these 1000 runs, such that the 95% confidence interval can be obtained. The exemplary simulation employs simulated voice traffic employing the GSM 6.10 codec represented as the common on/off model. Data traffic is based on Poisson arrival. The exemplary simulation, presents only downlink traffic for simplicity and clarity though the disclosure also applies to uplink traffic as will be appreciated by one of skill in the art. Normalized traffic intensity is estimated through a traffic estimator.

The exemplary mean energy consumption using simulations for both Poisson and non-Poisson traffic is illustrated at 1100. The 95% confidence interval for both results are the the same as, or similar to, each other. Thus, the algorithm can be considered to perform well when adapting to different kinds of traffic. As such, the MDP model and PO solving algorithm, while based on Poisson distribution, also function well for non-Poisson traffic. It can be observes from the FIG. 11, that the performance of the two kinds of traffic can be the same, or similar. This significant result, as will be appreciated by one of skill in the art, illustrates that the MDP modeling approach is applicable to many kinds of wireless traffic.

Figure 12:
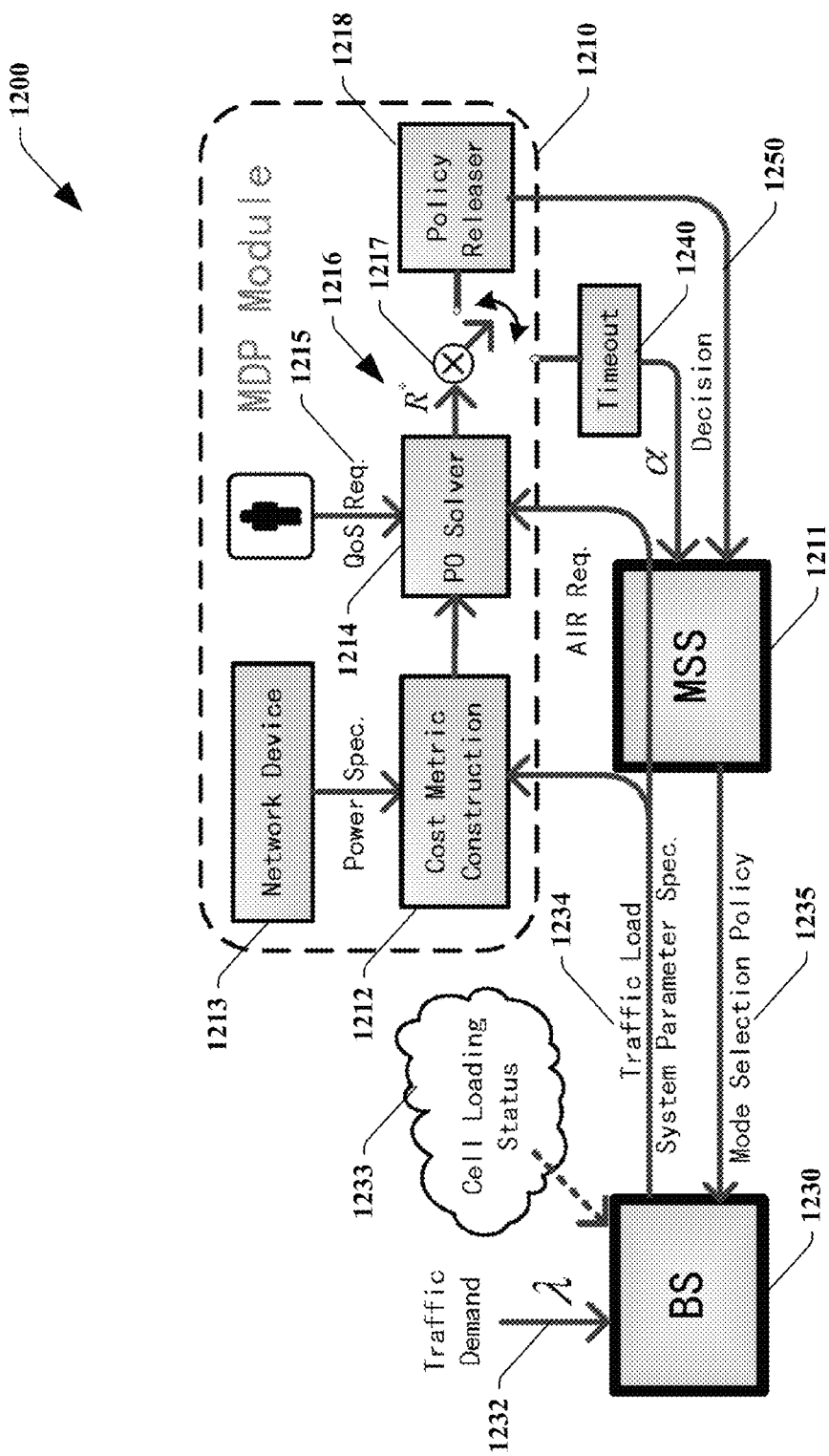
FIG. 12 illustrates an exemplary system including sleep mode selection employing a semi-Markov decision process in accordance with an aspect of the disclosed subject matter.

With regard to FIG. 12, an exemplary system 1200 adapted to use sleep mode selection employing a semi-Markov decision process in accordance with an aspect of the disclosed subject matter. Exemplary system 1200 can include MDP module 1210. MDP module 1210 can the same as, or similar to, MDP component 110 or 210. MDP module 1210 can include a cost metric construction component 1212 that can access network device 1213 parameters (e.g., power specifications, etc.) MDP module 1210 can include policy optimization (PO) solver 1214 that can access cost metric related data by way of cost metric construction component 1212. PO solver 1214 can further access additional data, for example QoS requirement 1215, among others (not illustrated). Moreover PO solver can access wireless traffic related data 1234, for example, traffic load data from a BS 1230. BS 1230 can access traffic demand related data 1232 (e.g., λ, etc.) and AIR data 1233 (e.g., cell loading status, etc.)

PO solver 1214 can facilitate access to one or more optimized sleep mode selection policies, R' 1216. Whereas the selection policy can comprise at least one of timeout-value or policy decision value, MDP module 1210 can further include a switch 1217. Switch 1217 can be any physical or logical switch or combinations thereof. Policy decision values can be passed to policy releaser 1218 that can facilitate access to the decision value or derivatives thereof 1250 by MSS 1211. Timeout-values can be passed to timeout component 1240 which can facilitate access to the timeout-values or derivatives thereof (e.g., a) by MSS 1211. MSS 1211 can provide BS 1230 with access to a mode selection policy 1235.

In an aspect, FIG. 12 illustrates an approach to implement sleep mode operation in a runtime environment for a MSS 1211 (or UE). MSS 1211 can, by way of MDP module 1210) initially compute and build up the cost metrics based on the system information and its own parameter settings; further the cost metrics, QoS constraints, and optimization targets can be passed to the PO solver for computing an optimized sleep mode selection policy. The output can be a set of state-action frequencies (e.g., at 1216) that can be translated into command probabilities (e.g., by the policy releaser 1218). The policy releaser 1218, in an aspect, can be responsible for issuing decisions (e.g., 1250) that are either randomized or deterministic (as previously disclosed herein) at each decision epoch. In a further aspect, policy R* 1216 can be related the optimized timeout value a that triggers transitions between sleep modes. For example, where MSS 1211 initially stays in $S_N$ and sleeps after it has been idle (no incoming traffic) for a certain amount of time α. If α expires before traffic shows up, MSS 1211 switches to $S_I$ or $S_{II}$ (e.g., depending on the value of $x_{S_N}(s\_I)$ and $x_{S_N}(s\_II)$). If a does not expire before traffic shows up, MSS 1211 can remain in $S_N$ with probability $(1-e^{-\lambda\alpha})$, which can be regarded as equivalent to the transition probability of s_N (see FIG. 3). Where, $1-e^{-\lambda\alpha}=x_{S_N}(s\_N))$, it follows that $$\alpha \triangleq \frac{1}{\lambda} \ln \frac{1}{1-x_{S_N}(s\_N)}, \quad (32)$$

which is a function of state action frequency $x_{S_N}(s\_N)$ and traffic demand λ. Where $x_{S_N}(s\_N)=0$, α becomes 0, indicating an instant switching scenario.

Figure 13:
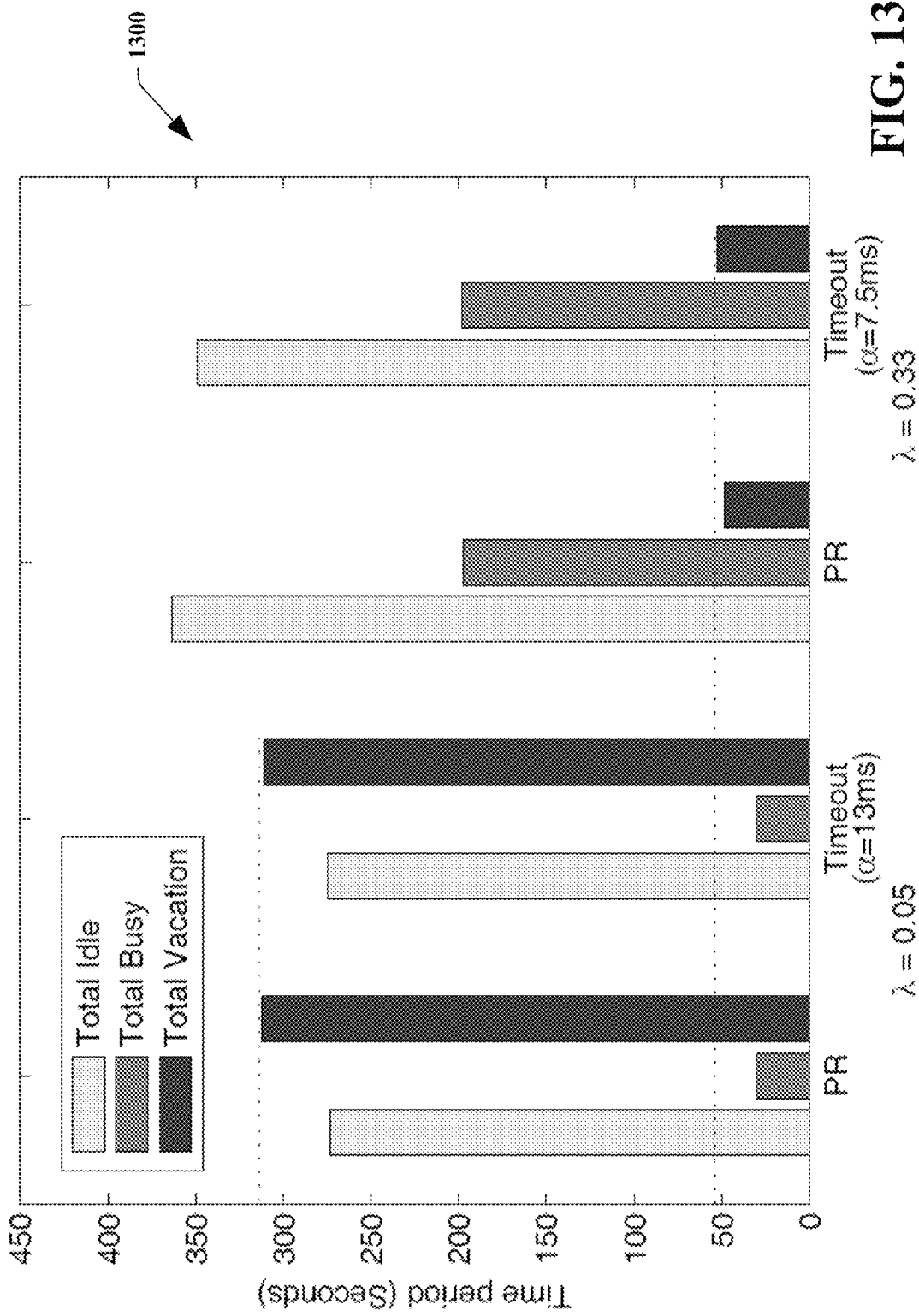
FIG. 13 is a plot of exemplary data contrasting timeout schema and decision schema in accordance with aspects of the disclosed subject matter.

FIG. 13 is a plot 1300 of exemplary data contrasting timeout schema and decision schema in accordance with aspects of the disclosed subject matter. Simulations showing that "timeout-values" (e.g., a values from FIG. 12) result in results that are the same as, or similar to, policy decision results (e.g., FIG. 12 at 1250). Two simulations are illustrated for timeout scheme and PR approach respectively. Both run for 10 minutes and parameter settings follow Table 1 as presented hereinabove. The total number of sleep mode switches and accumulative duration for various states are tracked in the simulation. The PO formulation is based on Eq.(30), where δ=2.3 ms. Two traffic conditions are employed (λ=0.05 and 0.33). For λ=0.05, $x(a)=[0.4787\ 0\ 0.5213]^T$ that can be approximated as equally switching between $S_N$ and $S_{II}$, while the timeout value can be calculated by Eq.(32): α≈13.0 ms. For λ=0.33, $x(a)=[0.9192\ 0\ 0.0808]^T$ and α≈7.5 ms. The time distributions are plotted such that PR and timeout values are compared by pair. The comparison illustrates similar results for both PR and timeout values for the total time staying in different stages (idle, busy, and vacation). Further, the frequencies of entering the sleep mode for both schemes are nearly the same(not illustrated), 14773 total entry times for λ=0.05 and 11241 for λ=0.33. The simulation demonstrates that the PR approach and timeout schemes can produce the same performance results.

Figure 14:
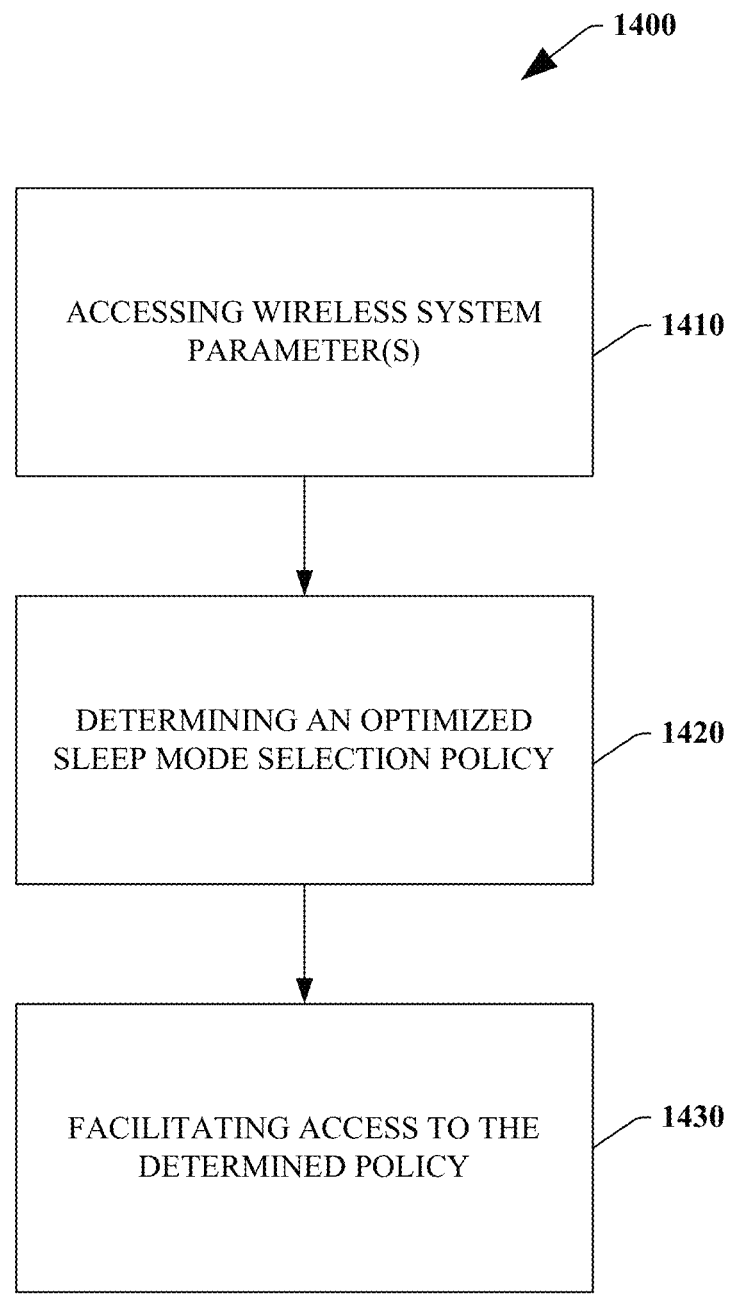
FIG. 14 illustrates a method that facilitates access to determined sleep mode selection policies in accordance with an aspect of the disclosed subject matter.
Figure 15:
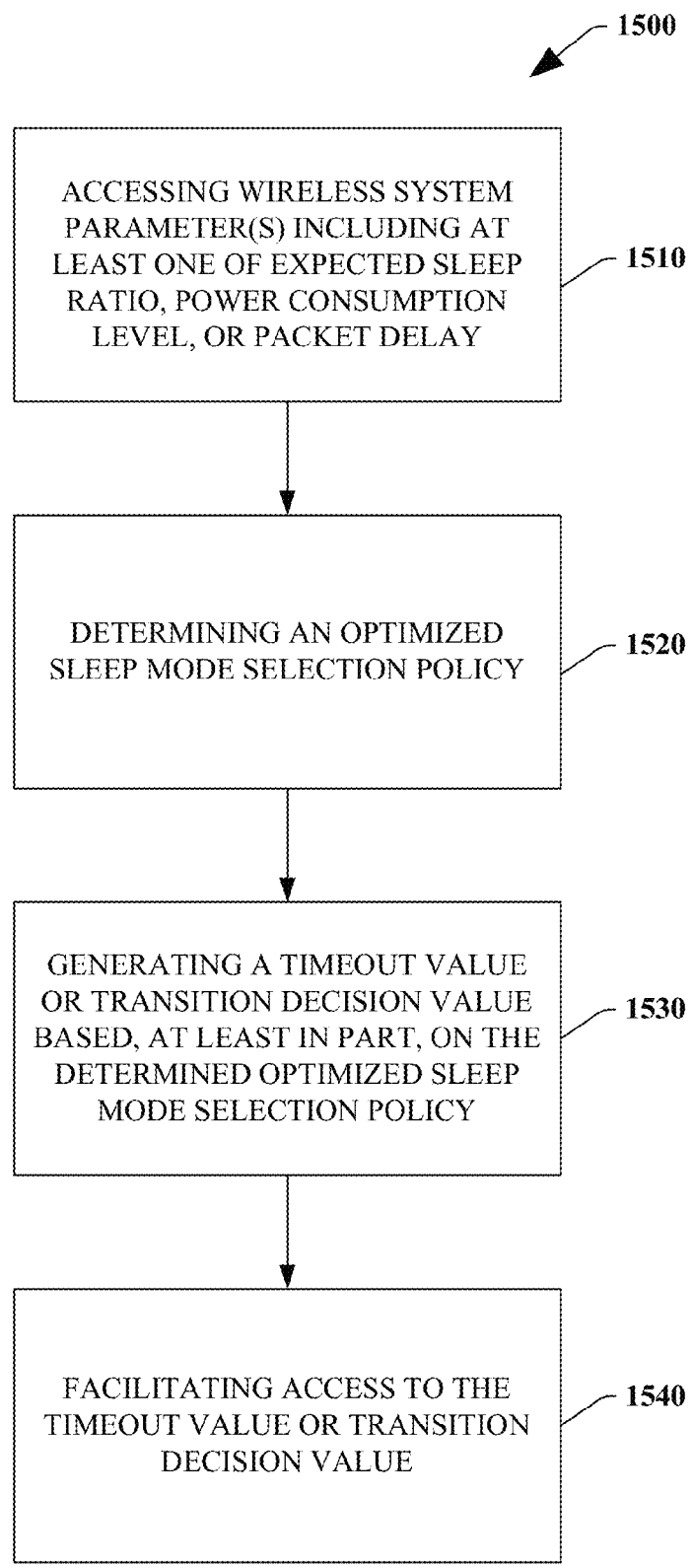
FIG. 15 illustrates a method that facilitates access to determined sleep mode selection policies in accordance with an aspect of the disclosed subject matter.

FIGS. 14-15 illustrate methods and/or flow diagrams in accordance with the disclosed subject matter. For simplicity of explanation, the methods are depicted and described as a series of acts. It is to be understood and appreciated that the various embodiments of the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states by way of state diagram or events. Additionally, it should be further appreciated that the methods disclosed hereinafter and throughout this specification are capable of being stored on an article of manufacture to facilitate transporting and transferring such methods to computers. The term article of manufacture, as used herein, can encompass a computer program accessible from any computer-readable device, carrier, or media.

FIG. 14 illustrates a method 1400 that facilitates access to determined sleep mode selection policies in accordance with an aspect of the disclosed subject matter. At 1410, method 1400 can include accessing one or more wireless system parameter(s). The parametric information can include wireless traffic conditions. At 1420, an optimized sleep mode selection policy can be determined. In an aspect, this determination can be based, at least in part, on the accessed wireless system parameter of 1410. Determining the selection policy can include employing a semi-Markov decision process (MDP) model. This model can be the same as, or similar to, that disclosed herein, for example, with regard to FIG. 3, etc.

In a further aspect, the determination at 1420 can include cost metric evaluation. Cost metric evaluation can include determining cost metrics for sleep ratio, energy cost, packet delay, etc. Cost metric evaluation can be the same as, or similar to, that disclosed herein, for example, in regard to FIGS. 4-6, among others. Determining the long term costs of transitions between sleep modes can facilitate quantitative determinations of the lowest power consumption over time while still meeting minimum performance conditions.

Determining at 1420 can further include policy optimization. That is, where there are more than one possible permutations of sleep mode selection policies, the policies can be optimized to seek a best case policy schema. Policy optimization can include determinations of power minimization, though policy optimization as it is disclosed herein is not so limited. For example, policy optimization can be the same as, or similar to, that disclosed with regard to FIGS. 7-8, etc.

At 1430, access to the determined policy can be facilitated. At this point method 1400 can end. In an aspect, the determined policy can be employed in executing a decision to follow a particular sleep mode at a decision epoch. For example, decision 1250 of FIG. 12 can be related to MSS 1211 selecting a particular sleep mode. In another aspect, the determined policy can be employed in selecting a sleep interval value at a decision epoch. For example, the timeout period a associated with timeout component 1240 of FIG. 12, can be selected or determined from accessing the policy determined at 1420.

FIG. 15 illustrates a method 1500 that facilitates access to determined sleep mode selection policies in accordance with an aspect of the disclosed subject matter. At 1510, at least one wireless system parameter can be accessed, including at least on one of expected sleep ration, expected power consumption level m, or expected packet delay. The access at 1510 can be the same as, or similar to, that at 1410 of method 1400. At 1520, an optimized sleep mode selection policy determination can occur. The determining at 1520 can include an MDP model and cost metric evaluation. At 1530 a timeout value or transition decision value can be generated based, at least in part, on the determined sleep mode selection policy. At 1540, access to the timeout value or transition decision value can be facilitated. At this point method 1500 can end.

Figure 16:
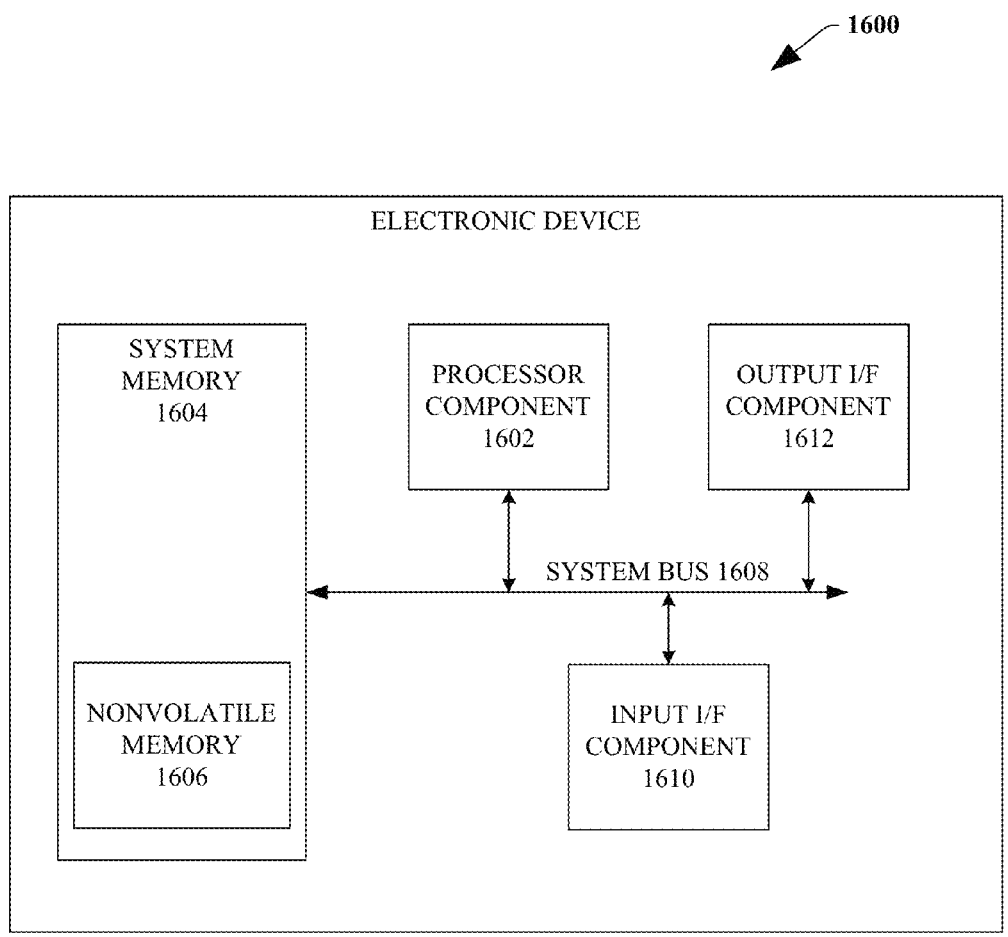
FIG. 16 illustrates a block diagram of an exemplary electronic device that can facilitate access to determined sleep mode selection policies in accordance with an aspect of the disclosed subject matter.

Referring to FIG. 16, illustrated is a block diagram of an exemplary, non-limiting electronic device 1600 that can utilize determined sleep mode selection policies in accordance with an aspect of the disclosed subject matter. The electronic device 1600 can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), secure memory devices with computational capabilities, devices with a tamper-resistant chip(s), an electronic device associated with an industrial control system, an embedded computer in a machine (e.g., an airplane, a copier, a motor vehicle, a microwave oven), and the like.

Components of the electronic device 1600 can include, but are not limited to, a processor component 1602, a system memory 1604 (with nonvolatile memory 1606), and a system bus 1608 that can couple various system components including the system memory 1604 to the processor component 1602. The system bus 1608 can be any of various types of bus structures including a memory bus or memory controller, a peripheral bus, or a local bus using any of a variety of bus architectures.

Electronic device 1600 can typically include a variety of computer readable media. Computer readable media can be any available media that can be accessed by the electronic device 1600. By way of example, and not limitation, computer readable media can comprise computer storage media and communication media. Computer storage media can include volatile, non-volatile, removable, and non-removable media that can be implemented in any method or technology for storage of information, such as computer readable instructions, data structures, program modules or other data. Computer storage media includes, but is not limited to, RAM, ROM, EEPROM, nonvolatile memory 1606 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1600. Communication media typically can embody computer readable instructions, data structures, program modules or other data in a modulated data signal such as a carrier wave or other transport mechanism and includes any information delivery media.

The system memory 1604 can include computer storage media in the form of volatile and/or nonvolatile memory 1606. A basic input/output system (BIOS), containing the basic routines that help to transfer information between elements within electronic device 1600, such as during start-up, can be stored in memory 1604. Memory 1604 can typically contain data and/or program modules that can be immediately accessible to and/or presently be operated on by processor component 1602. By way of example, and not limitation, system memory 1604 can also include an operating system, application programs, other program modules, and program data.

The nonvolatile memory 1606 can be removable or non-removable. For example, the nonvolatile memory 1606 can be in the form of a removable memory card or a USB flash drive. In accordance with one aspect, the nonvolatile memory 1606 can include flash memory (e.g., single-bit flash memory, multi-bit flash memory), ROM, PROM, EPROM, EEPROM, and/or NVRAM (e.g., FeRAM), or a combination thereof, for example. Further, the flash memory can be comprised of NOR flash memory and/or NAND flash memory.

A user can enter commands and information into the electronic device 1600 through input devices (not illustrated) such as a keypad, microphone, tablet or touch screen although other input devices can also be utilized. These and other input devices can be connected to the processor component 1602 through input interface component 1610 that can be connected to the system bus 1608. Other interface and bus structures, such as a parallel port, game port or a universal serial bus (USB) can also be utilized. A graphics subsystem (not illustrated) can also be connected to the system bus 1608. A display device (not illustrated) can be also connected to the system bus 1608 via an interface, such as output interface component 1612, which can in turn communicate with video memory. In addition to a display, the electronic device 1600 can also include other peripheral output devices such as speakers (not illustrated), which can be connected through output interface component 1612.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

As utilized herein, terms "component," "system," "interface," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description may have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system comprising:
a memory to store instructions; and
a processor, coupled to the memory, that facilitates execution of the instructions to perform operations comprising:
accessing a set of sleep mode instructions comprising a first sleep mode instruction for a first sleep mode defined in a corresponding wireless communication standard and a second sleep mode instruction for a second sleep mode defined in the corresponding wireless communication standard, wherein a sleep mode instruction of the set of sleep mode instructions is selectable based on a sleep mode selection policy; and
modifying the sleep mode selection policy based on a semi-Markov decision process model to form a modified sleep mode selection policy without modification of the sleep mode instruction of the set of sleep mode instructions.

2. The system of claim 1, wherein the operations further comprise determining a cost metric value based on a related action of the semi-Markov decision process model.

3. The system of claim 2, wherein the determining the cost metric value comprises determining the cost metric value further based on a sleep ratio value, an energy cost value, or a packet delay value.

4. The system of claim 1, wherein the modifying the sleep mode selection policy comprises employing a linear programming policy optimization.

5. The system of claim 4, wherein the linear programming policy optimization reduces a projected power consumption of the system subject to a delay constraint threshold value.

6. The system of claim 1, wherein the sleep mode instruction of the set of sleep mode instructions corresponds to a determined timeout delay value or a sleep mode transition value.

7. The system of claim 1, wherein the corresponding wireless communication standard is the Institute of Electrical and Electronics Engineers 802.16e-2005 standard.

8. The system of claim 1, the operations further comprising:
receiving a wireless system parameter; and
selecting the sleep mode instruction of the set of sleep mode instructions based on the modified sleep mode selection policy and the wireless system parameter.

9. The system of claim 8, wherein the wireless system parameter includes a traffic demand parameter.

10. The system of claim 8, wherein the wireless system parameter includes of a mobile subscriber station parameter, a cost metric parameter, a quality of service parameter, or an optimization target.

11. The system of claim 8, wherein the selecting the sleep mode instruction of the set of sleep mode instructions comprises selecting the sleep mode instruction based on a ranked plurality of modified sleep mode selection policies of a set of sleep mode selection policies comprising the modified sleep mode selection policy.

12. The system of claim 11, wherein a quality of service requirement is satisfied by the sleep mode instruction of the set of sleep mode instructions.

13. A method, comprising:
accessing, by a system comprising a processor, a wireless communication parameter of a wireless communication link between a base station device and a mobile device;
receiving a first sleep mode instruction for a first sleep mode of a wireless communication standard employed by the wireless communication link;
receiving a second sleep mode instruction for a second sleep mode of the wireless communication standard; and
modifying, by the system, a sleep mode selection policy, based on a semi-Markov decision process and the wireless communication parameter, to form a modified sleep mode selection policy, wherein a sleep mode instruction, of a set of sleep mode instructions comprising the first sleep mode instruction and second sleep mode instruction, is configured to be selected based on the modified sleep mode selection policy.

14. The method of claim 13, wherein the wireless communication standard is the Institute of Electrical and Electronics Engineers 802.16e-2005 standard.

15. The method of claim 13, wherein the accessing the wireless communication parameter comprises accessing a sleep ratio value, a power consumption level value, or a packet delay value.

16. The method of claim 13, further comprising:
selecting, by the system, a sleep mode instruction of the set of sleep mode instructions based on the modified sleep mode selection policy; and
generating, by the system, a timeout value or transition decision value associated with the mobile device employing the sleep mode instruction.

17. The method of claim 13, wherein the wireless device employing the sleep mode instruction is predictively determined to not conflict with a quality of service requirement of the wireless communication link.

18. A mobile subscriber station comprising:
a memory to store instructions; and
a processor, coupled to the memory, that facilitates execution of the instructions to perform operations comprising:
modeling a sleep mode selection policy of the mobile subscriber station as a semi-Markov decision process to facilitate computing performance evaluations of wireless power saving classes associated with the mobile subscriber station and a wireless link to a base station device or access point device of a wireless communications system, wherein a set of sleep mode operations comprises a first sleep mode operation for a first defined sleep mode of a wireless communication standard employed by the wireless communication link and a second sleep mode operation for a second defined sleep mode of the wireless communication standard;
modifying a sleep mode selection policy without modification of the set of sleep mode operations, to form a modified sleep mode selection policy, based on the modeling of the sleep mode selection policy;
modeling a cost function for a behavior of the sleep mode operation of the mobile subscriber station; and
selecting a sleep mode operation of the set of sleep mode operations based on the modified sleep mode selection policy and the modeling the cost function.

19. The mobile subscriber station of claim 18, the operations further comprising:
modeling a cost function for a behavior of the sleep mode operation of the mobile subscriber station.

20. The mobile subscriber station of claim 19, the operations further comprising:
selecting a sleep mode operation of the set of sleep mode operations based on the modified sleep mode selection policy and the cost function.

21. A computer-readable storage medium having instructions stored thereon that, in response to execution, cause a system comprising a processor to perform operations, comprising:

modeling a sleep mode selection policy of a mobile subscriber station as a semi-Markov decision process to facilitate an evaluation of wireless power saving classes associated with the mobile subscriber station and a wireless link with a base station device or access point device of a wireless communications system, wherein a set of sleep mode operations comprises a first sleep mode operation for a first sleep mode of a wireless communication standard employed by the wireless communication link and a second sleep mode operation for a second sleep mode of the wireless communication standard; and modifying a sleep mode selection policy without modification of the set of sleep mode operations, to form a modified sleep mode selection policy, based on the modeling the sleep mode selection policy.

22. The computer readable storage medium of claim 21, wherein the wireless communication standard is the Institute of Electrical and Electronics Engineers 802.16e-2005 standard.

\* \* \* \* \*